United States Patent
Tseng

(10) Patent No.: US 9,461,481 B2
(45) Date of Patent: Oct. 4, 2016

(54) SYSTEMS AND METHODS FOR CONTROLLING OUTPUT POWER OF A WIRELESS POWER TRANSMITTER

(71) Applicant: QUALCOMM Incorporated, San Diego, CA (US)

(72) Inventor: Ryan Tseng, Coronado, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/829,135

(22) Filed: Aug. 18, 2015

(65) Prior Publication Data

US 2015/0357832 A1 Dec. 10, 2015

Related U.S. Application Data

(62) Division of application No. 13/396,513, filed on Feb. 14, 2012, now Pat. No. 9,118,357.

(60) Provisional application No. 61/444,069, filed on Feb. 17, 2011.

(51) Int. Cl.
*H02J 17/00* (2006.01)
*H02J 5/00* (2016.01)
*H04B 5/00* (2006.01)

(52) U.S. Cl.
CPC .......... *H02J 5/005* (2013.01); *H02J 17/00* (2013.01); *H04B 5/0037* (2013.01); *H04B 5/0081* (2013.01)

(58) Field of Classification Search
CPC ....................................................... H02J 17/00
USPC ....................................................... 307/104
See application file for complete search history.

(56) References Cited

U.S. PATENT DOCUMENTS

| 4,833,338 | A | 5/1989 | Bartlett et al. |
|---|---|---|---|
| 8,258,652 | B2 | 9/2012 | Sekino et al. |
| 2007/0145830 | A1 | 6/2007 | Lee et al. |
| 2008/0157909 | A1 | 7/2008 | Chen et al. |
| 2009/0038623 | A1 | 2/2009 | Farbarik et al. |
| 2009/0096413 | A1 | 4/2009 | Partovi et al. |
| 2009/0174263 | A1 | 7/2009 | Baarman et al. |
| 2009/0224609 | A1 | 9/2009 | Cook et al. |
| 2009/0243397 | A1 | 10/2009 | Cook et al. |

(Continued)

FOREIGN PATENT DOCUMENTS

| WO | WO 2009081115 A1 | 7/2009 |
|---|---|---|
| WO | WO 2010093964 A2 | 9/2009 |

(Continued)

OTHER PUBLICATIONS

International Search Report and Written Opinion—PCT/US2012/025283—ISA/EPO—Jun. 5, 2012.

*Primary Examiner* — Robert Deberadinis
(74) *Attorney, Agent, or Firm* — Knobbe Martens Olson & Bear LLP

(57) ABSTRACT

Systems and methods for feedback control of output power in a wireless power transmitter are disclosed. According to one aspect, one of a voltage level at an input of a wireless power transmit coil and a level of current passing through the wireless power transmit coil are sensed. The wireless power transmitter includes a controller configured to adjust an electrical characteristic of the wireless power transmitter to maintain at least one of the level of current and the voltage level at a constant level.

24 Claims, 17 Drawing Sheets

(56) References Cited

U.S. PATENT DOCUMENTS

| | | |
|---|---|---|
| 2010/0066349 A1 | 3/2010 | Lin et al. |
| 2010/0207572 A1 | 8/2010 | Kirby et al. |
| 2010/0244577 A1 | 9/2010 | Shimokawa |
| 2010/0308939 A1 | 12/2010 | Kurs |
| 2012/0001485 A1 | 1/2012 | Uchida |
| 2012/0242160 A1 | 9/2012 | Tseng |

FOREIGN PATENT DOCUMENTS

| | | |
|---|---|---|
| WO | WO-2010093964 A2 | 8/2010 |
| WO | WO-2010119577 A1 | 10/2010 |

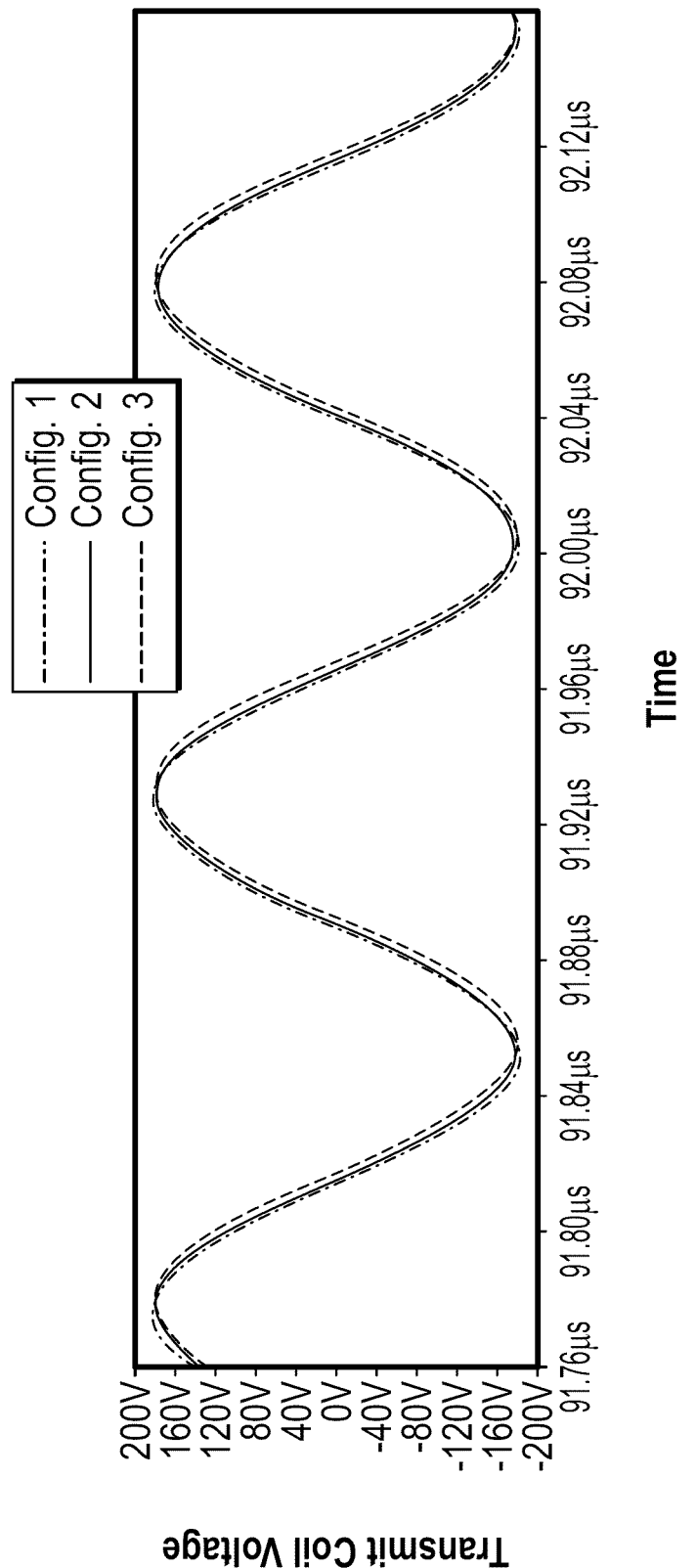

SYSTEMS AND METHODS FOR CONTROLLING OUTPUT POWER OF A WIRELESS POWER TRANSMITTER

CROSS REFERENCE TO RELATED APPLICATIONS

This application is a divisional of U.S. patent application Ser. No. 13/396,513, filed on Feb. 14, 2012, now U.S. Pat. No. 9,118,357, which claims the priority benefit under 35 U.S.C. §119(e) to U.S. Provisional Patent Application No. 61/444,069 entitled "LOOSELY COUPLED WIRELESS POWER SYSTEM WITH CURRENT CONTROLLED WINDING" filed on Feb. 17, 2011, the disclosure of which is hereby incorporated by reference in its entirety.

This invention was made with Government support under Award No. IIP-0945759 awarded by the National Science Foundation. The Government has certain rights in this invention.

FIELD

The present invention relates generally to feedback control of output power in a wireless power transmitter. More specifically, the disclosure is directed to maintaining one of a current and a voltage of a wireless power transmit coil.

BACKGROUND

An increasing number and variety of electronic devices are powered via rechargeable batteries. Such devices include mobile phones, portable music players, laptop computers, tablet computers, computer peripheral devices, communication devices (e.g., Bluetooth devices), digital cameras, hearing aids, and the like. While battery technology has improved, battery-powered electronic devices increasingly require and consume greater amounts of power. As such, these devices constantly require recharging. Rechargeable devices are often charged via wired connections through cables or other similar connectors that are physically connected to a power supply. Cables and similar connectors may sometimes be inconvenient or cumbersome and have other drawbacks. Wireless charging systems that are capable of transferring power in free space to be used to charge rechargeable electronic devices or provide power to electronic devices may overcome some of the deficiencies of wired charging solutions. As such, wireless power transfer systems and methods that efficiently and safely transfer power to electronic devices are desirable.

SUMMARY OF THE INVENTION

Various implementations of systems, methods and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

One aspect of the disclosure describes a wireless power transmitter including a wireless power transmit coil configured to transmit power to a wireless power receiver via an electromagnetic field, the wireless power transmit coil having a transmit coil current passing through the wireless power transmit coil, a sensor configured to sense a level of the transmit coil current and generate a sensing signal, and a controller configured to adjust a component of the transmitter based on the sensing signal to maintain the transmit coil current at a constant level.

Another aspect of the disclosure describes a wireless power transmitter including a wireless power transmit coil configured to transmit power to a wireless power receiver via an electromagnetic field, the wireless power transmit coil having a transmit coil voltage at an input of the wireless power transmit coil, a sensor configured to sense a level of the transmit coil voltage and generate a sensing signal, and a controller configured to adjust a component of the transmitter based on the sensing signal to maintain the transmit coil voltage at a constant voltage level.

Another aspect of the disclosure describes a method for transferring power via a wireless field including transmitting power from a wireless power transmitter to a wireless power receiver via an electromagnetic field, the wireless power transmitter including a transmit coil having a transmit coil current passing through the transmit coil, sensing a level of the transmit coil current, and adjusting a component of the transmitter based on the sensed level of transmit coil current to maintain the transmit coil current at a constant level.

Another aspect of the disclosure describes a method for transferring power via a wireless field including transmitting power from a wireless power transmitter to a wireless power receiver via an electromagnetic field, the wireless power transmitter including a wireless power transmit coil having a transmit coil voltage at an input of the transmit coil, sensing a level of the wireless power transmit coil voltage, and adjusting a component of the transmitter based on the sensed level of transmit coil voltage to maintain the transmit coil voltage at a constant voltage level.

Another aspect of the disclosure describes an apparatus for transferring power via a wireless field including means for transmitting power from a wireless power transmitter to a wireless power receiver via an electromagnetic field, means for sensing a level of a current passing through the means for transmitting power, and means for adjusting a component of the transmitter based on the sensed level to maintain the current through the means for transmitting power at a constant level.

Another aspect of the disclosure describes an apparatus for transferring power via a wireless field including means for transmitting power from a wireless power transmitter to a wireless power receiver via an electromagnetic field, means for sensing a voltage level at an input of the means for transmitting power, and means for adjusting a component of the transmitter based on the sensed voltage level to maintain the voltage at the input of the means for transmitting power at a constant voltage level.

BRIEF DESCRIPTION OF THE DRAWINGS

FIG. 8C is a plot showing voltage across a wireless power transmit coil based on various loading conditions presented to a wireless power transmitter.

Figure 1:
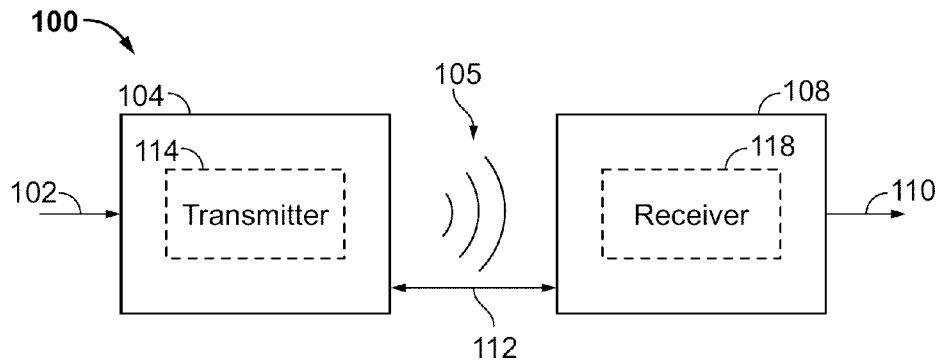
FIG. 1 is a functional block diagram of an exemplary wireless power transfer system, in accordance with exemplary embodiments of the invention.

The various features illustrated in the drawings may not be drawn to scale. Accordingly, the dimensions of the various features may be arbitrarily expanded or reduced for clarity. In addition, some of the drawings may not depict all of the components of a given system, method or device.

Finally, like reference numerals may be used to denote like features throughout the specification and figures.

DETAILED DESCRIPTION

The detailed description set forth below in connection with the appended drawings is intended as a description of exemplary embodiments of the invention and is not intended to represent the only embodiments in which the invention may be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. The exemplary embodiments of the invention may be practiced without these specific details. In some instances, well-known structures and devices are shown in block diagram form in order to avoid obscuring the novelty of the exemplary embodiments presented herein.

Wirelessly transferring power may refer to transferring any form of energy associated with electric fields, magnetic fields, electromagnetic fields, or otherwise from a transmitter to a receiver without the use of physical electrical conductors (e.g., power may be transferred through free space). The power output into a wireless field (e.g., a magnetic field) may be received, captured by, or coupled by a "receiving coil" to achieve power transfer.

FIG. 1 is a functional block diagram of an exemplary wireless power transfer system 100, in accordance with exemplary embodiments of the invention. Input power 102 may be provided to a transmitter 104 from a power source (not shown) for generating a field 105 for providing energy transfer. A receiver 108 may couple to the field 105 and generate output power 110 for storing or consumption by a device (not shown) coupled to the output power 110. Both the transmitter 104 and the receiver 108 are separated by a distance 112. In one exemplary embodiment, transmitter 104 and receiver 108 are configured according to a mutual resonant relationship. When the resonant frequency of receiver 108 and the resonant frequency of transmitter 104 are substantially the same or very close, transmission losses between the transmitter 104 and the receiver 108 are minimal. As such, wireless power transfer may be provided over larger distance in contrast to purely inductive solutions that may require large coils that require coils to be very close (e.g., mms). Resonant inductive coupling techniques may thus allow for improved efficiency and power transfer over various distances and with a variety of inductive coil configurations.

The receiver 108 may receive power when the receiver 108 is located in an energy field 105 produced by the transmitter 104. The field 105 corresponds to a region where energy output by the transmitter 104 may be captured by a receiver 105. In some cases, the field 105 may correspond to the "near-field" of the transmitter 104 as will be further described below. The transmitter 104 may include a transmit coil 114 for outputting an energy transmission. The receiver 108 further includes a receive coil 118 for receiving or capturing energy from the energy transmission. The near-field may correspond to a region in which there are strong reactive fields resulting from the currents and charges in the transmit coil 114 that minimally radiate power away from the transmit coil 114. In some cases the near-field may correspond to a region that is within about one wavelength (or a fraction thereof) of the transmit coil 114. The transmit and receive coils 114 and 118 are sized according to applications and devices to be associated therewith. As described above, efficient energy transfer may occur by coupling a large portion of the energy in a field 105 of the transmit coil 114 to a receive coil 118 rather than propagating most of the energy in an electromagnetic wave to the far field. When positioned within the field 105, a "coupling mode" may be developed between the transmit coil 114 and the receive coil 118. The area around the transmit and receive coils 114 and 118 where this coupling may occur is referred to herein as a coupling-mode region.

Figure 2:
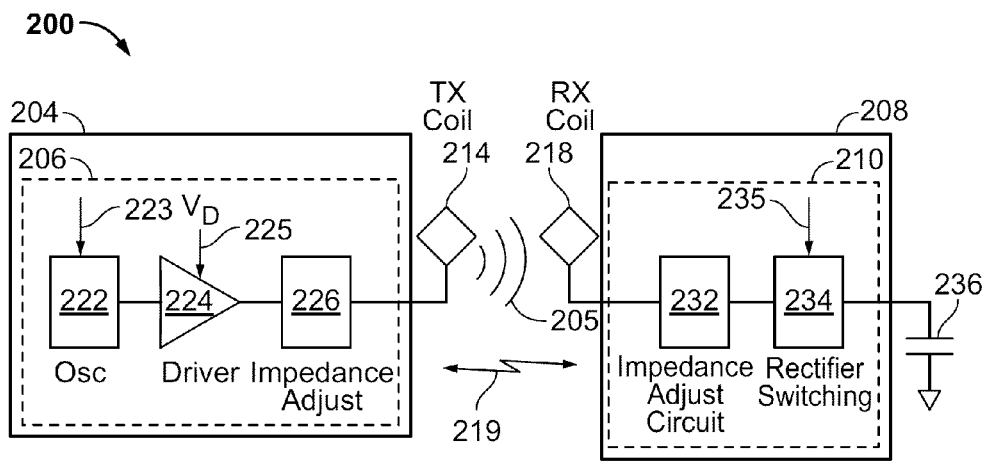
FIG. 2 is a functional block diagram of exemplary components that may be used in the wireless power transfer system of FIG. 1, in accordance with various exemplary embodiments of the invention.

FIG. 2 is a functional block diagram of exemplary components that may be used in the wireless power transfer system 100 of FIG. 1, in accordance with various exemplary embodiments of the invention. The transmitter 204 may include transmit circuitry 206 that may include an oscillator 222, a driver circuit 224, and a filter and matching circuit 226. The oscillator 222 may be configured to generate a signal at a desired frequency, such as 468.75 KHz, 6.78 MHz or 13.56 MHz that may be adjusted in response to a frequency control signal 223. The oscillator signal may be provided to a driver circuit 224 configured to drive the transmit coil 214 at, for example, a resonant frequency of the transmit coil 214. The driver circuit 224 may be a switching amplifier configured to receive a square wave from the oscillator 222 and output a sine wave. For example, the driver circuit 224 may be a class E amplifier. A filter and matching circuit 226 may be also included to filter out harmonics or other unwanted frequencies and match the impedance of the transmitter 204 to the transmit coil 214.

The receiver 208 may include receive circuitry 210 that may include a matching circuit 232 and a rectifier and switching circuit 234 to generate a DC power output from an AC power input to charge a battery 236 as shown in FIG. 2 or to power a device (not shown) coupled to the receiver 108. The matching circuit 232 may be included to match the impedance of the receive circuitry 210 to the receive coil 218. The receiver 208 and transmitter 204 may additionally communicate on a separate communication channel 219 (e.g., Bluetooth, zigbee, cellular, etc). The receiver 208 and transmitter 204 may alternatively communicate via in-band signaling using characteristics of the wireless field 206.

As described more fully below, receiver 208, that may initially have an associated load that is configured to be selectively disabled (e.g., battery 236), may be configured to determine whether an amount of power transmitted by transmitter 204 and receiver by receiver 208 is appropriate for charging a battery 236. Further, receiver 208 may be configured to enable a load (e.g., battery 236) upon determining that the amount of power is appropriate. In some embodiments, a receiver 208 may be configured to directly utilize power received from a wireless power transfer field without charging of a battery 236. For example, a communication device, such as a near-field communication (NFC) or radio-frequency identification device (RFID may be configured to receive power from a wireless power transfer field and communicate by interacting with the wireless power transfer field and/or utilize the received power to communicate with a transmitter 204 or other devices.

Figure 3:
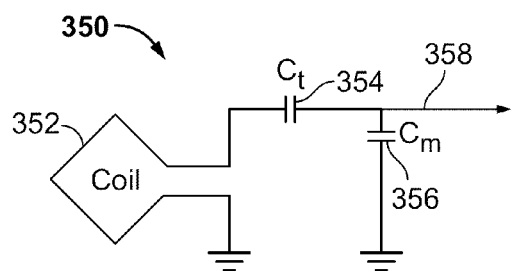
FIG. 3 is a schematic diagram of a portion of transmit circuitry or receive circuitry of FIG. 2 including a transmit or receive coil, in accordance with exemplary embodiments of the invention.

FIG. 3 is a schematic diagram of a portion of transmit circuitry 206 or receive circuitry 210 of FIG. 2 including a transmit or receive coil 352, in accordance with exemplary embodiments of the invention. As illustrated in FIG. 3, transmit or receive circuitry 350 used in exemplary embodiments may include a coil 352. The coil may also be referred to or be configured as a "loop" antenna 352. The coil 352 may also be referred to herein or be configured as a "magnetic" antenna or an induction coil. The term "coil" is intended to refer to a component that may wirelessly output or receive energy for coupling to another "coil." The coil may also be referred to as an "antenna" of a type that is configured to wirelessly output or receive power. The coil 352 may be configured to include an air core or a physical core such as a ferrite core (not shown). Air core loop coils may be more tolerable to extraneous physical devices placed in the vicinity of the core. Furthermore, an air core loop coil 352 allows the placement of other components within the core area. In addition, an air core loop may more readily enable placement of the receive coil 218 (FIG. 2) within a plane of the transmit coil 214 (FIG. 2) where the coupled-mode region of the transmit coil 214 (FIG. 2) may be more powerful.

As stated, efficient transfer of energy between the transmitter 104 and receiver 108 may occur during matched or nearly matched resonance between the transmitter 104 and the receiver 108. However, even when resonance between the transmitter 104 and receiver 108 are not matched, energy may be transferred, although the efficiency may be affected. Transfer of energy occurs by coupling energy from the field 105 of the transmitting coil to the receiving coil residing in the neighborhood where this field 105 is established rather than propagating the energy from the transmitting coil into free space.

The resonant frequency of the loop or magnetic coils is based on the inductance and capacitance. Inductance may be simply the inductance created by the coil 352, whereas, capacitance may be added to the coil's inductance to create a resonant structure at a desired resonant frequency. As a non-limiting example, capacitor 352 and capacitor 354 may be added to the transmit or receive circuitry 350 to create a resonant circuit that selects a signal 356 at a resonant frequency. Accordingly, for larger diameter coils, the size of capacitance needed to sustain resonance may decrease as the diameter or inductance of the loop increases. Furthermore, as the diameter of the coil increases, the efficient energy transfer area of the near-field may increase. Other resonant circuits formed using other components are also possible. As another non-limiting example, a capacitor may be placed in parallel between the two terminals of the coil 350. For transmit coils, a signal 358 with a frequency that substantially corresponds to the resonant frequency of the coil 352 may be an input to the coil 352.

In one embodiment, the transmitter 104 may be configured to output a time varying magnetic field with a frequency corresponding to the resonant frequency of the transmit coil 114. When the receiver is within the field 105, the time varying magnetic field may induce a current in the receive coil 118. As described above, if the receive coil 118 is configured to be resonant at the frequency of the transmit coil 118, energy may be efficiently transferred. The AC signal induced in the receive coil 118 may be rectified as described above to produce a DC signal that may be provided to charge or to power a load.

Figure 4:
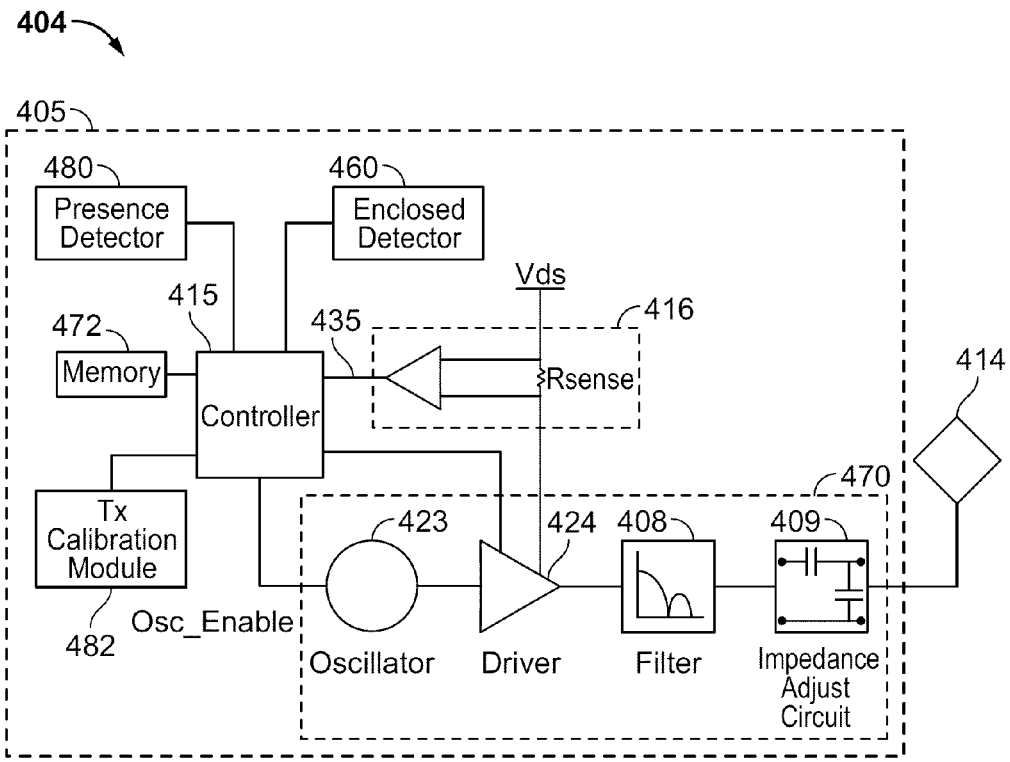
FIG. 4 is a functional block diagram of a transmitter that may be used in the wireless power transfer system of FIG. 1, in accordance with exemplary embodiments of the invention.

FIG. 4 is a functional block diagram of a transmitter 404 that may be used in the wireless power transfer system of FIG. 1, in accordance with exemplary embodiments of the invention. The transmitter 404 may include transmit circuitry 405 and a transmit coil 414. The transmit coil 414 may be the coil 352 as shown in FIG. 3. Transmit circuitry 405 may provide RF power to the transmit coil 414 by providing an oscillating signal resulting in generation of energy (e.g., magnetic flux) about the transmit coil 414. Transmitter 404 may operate at any suitable frequency. By way of example, transmitter 404 may operate at the 13.56 MHz ISM band.

Transmit circuitry 405 may include a TX impedance adjustment circuit 409 for adjusting the impedance of the transmit circuitry 405 based on the impedance of the transmit coil 414 to increase efficiency. The transmit circuitry 405 may also include a low pass filter (LPF) 408 configured to reduce harmonic emissions to levels to prevent self-jamming of devices coupled to receivers 108 (FIG. 1). Other exemplary embodiments may include different filter topologies, including but not limited to, notch filters that attenuate specific frequencies while passing others and may include an adaptive impedance match, that may be varied based on measurable transmit metrics, such as output power to the coil 414 or DC current drawn by the driver circuit 424. Transmit circuitry 405 further includes a driver circuit 424 configured to drive an RF signal as determined by an oscillator 423. The oscillator 423, driver 424, low pass filter 408 and impedance adjustment circuit 409 may be commonly referred to as transmitter driving circuit 470. The transmit circuitry 405 may be comprised of discrete devices or circuits, or alternately, may be comprised of an integrated assembly. An exemplary RF power output from transmit coil 414 may be on the order of 2.5 Watts.

Transmit circuitry 405 may further include a controller 415 for selectively enabling the oscillator 423 during transmit phases (or duty cycles) for specific receivers, for adjusting the frequency or phase of the oscillator 423, and for adjusting the output power level for implementing a communication protocol for interacting with neighboring devices through their attached receivers. It is noted that the controller 415 may also be referred to herein as processor 415. Adjustment of oscillator phase and related circuitry in the transmission path may allow for reduction of out of band emissions, especially when transitioning from one frequency to another.

The transmit circuitry 405 may further include a load sensing circuit 416 for detecting the presence or absence of active receivers in the vicinity of the near-field generated by transmit coil 414. By way of example, a load sensing circuit 416 monitors the current flowing to the driver circuit 424, that may be affected by the presence or absence of active receivers in the vicinity of the field generated by transmit coil 414 as will be further described below. Detection of changes to the loading on the driver circuit 424 are monitored by controller 415 for use in determining whether to enable the oscillator 423 for transmitting energy and to communicate with an active receiver. As described more fully below, a current measured at the driver circuit 424 may be used to determine whether an invalid device is positioned within a wireless power transfer region of the transmitter 404.

The transmit coil 414 may be implemented with a Litz wire or as an antenna strip with the thickness, width and metal type selected to keep resistive losses low. In a one implementation, the transmit coil 414 may generally be configured for association with a larger structure such as a table, mat, lamp or other less portable configuration. Accordingly, the transmit coil 414 generally may not need "turns" in order to be of a practical dimension. An exemplary implementation of a transmit coil 414 may be "electrically small" (i.e., fraction of the wavelength) and tuned to resonate at lower usable frequencies by using capacitors to define the resonant frequency.

The transmitter 404 may gather and track information about the whereabouts and status of receiver devices that may be associated with the transmitter 404. Thus, the transmit circuitry 405 may include a memory 472, a presence detector 480, an enclosed detector 460, or a combination thereof, connected to the controller 415 (also referred to as a processor herein). The controller 415 may adjust an amount of power delivered by the driver circuit 424 in response to presence signals from the presence detector 480 and the enclosed detector 460. The transmitter 404 may receive power through a number of power sources, such as, for example, an AC-DC converter (not shown) to convert conventional AC power present in a building, a DC-DC converter (not shown) to convert a conventional DC power source to a voltage suitable for the transmitter 404, or directly from a conventional DC power source (not shown).

As a non-limiting example, the presence detector 480 may be a motion detector utilized to sense the initial presence of a device to be charged that is inserted into the coverage area of the transmitter 404. After detection, the transmitter 404 may be turned on and the RF power received by the device may be used to toggle a switch on the RX device in a pre-determined manner, which in turn results in changes to the driving point impedance of the transmitter 404.

As another non-limiting example, the presence detector 480 may be a detector capable of detecting a human, for example, by infrared detection, motion detection, or other suitable means. In some exemplary embodiments, there may be regulations limiting the amount of power that a transmit coil 414 may transmit at a specific frequency. In some cases, these regulations are meant to protect humans from electromagnetic radiation. However, there may be environments where a transmit coil 414 is placed in areas not occupied by humans, or occupied infrequently by humans, such as, for example, garages, factory floors, shops, and the like. If these environments are free from humans, it may be permissible to increase the power output of the transmit coil 414 above the normal power restrictions regulations. In other words, the controller 415 may adjust the power output of the transmit coil 414 to a regulatory level or lower in response to human presence and adjust the power output of the transmit coil 414 to a level above the regulatory level when a human is outside a regulatory distance from the electromagnetic field of the transmit coil 414.

As a non-limiting example, the enclosed detector 460 (may also be referred to herein as an enclosed compartment detector or an enclosed space detector) may be a device such as a sense switch for determining when an enclosure is in a closed or open state. When a transmitter is in an enclosure that is in an enclosed state, a power level of the transmitter may be increased.

In exemplary embodiments, a method by which the transmitter 404 does not remain on indefinitely may be used. In this case, the transmitter 404 may be programmed to shut off after a user-determined amount of time. This feature prevents the transmitter 404, notably the driver circuit 424, from running long after the wireless devices in its perimeter are fully charged. This event may be due to the failure of the circuit to detect the signal sent from either the repeater or the receive coil that a device is fully charged. To prevent the transmitter 404 from automatically shutting down if another device is placed in its perimeter, the transmitter 404 automatic shut off feature may be activated only after a set period of lack of motion detected in its perimeter. The user may be able to determine the inactivity time interval, and change it as desired. As a non-limiting example, the time interval may be longer than that needed to fully charge a specific type of wireless device under the assumption of the device being initially fully discharged.

Figure 5:
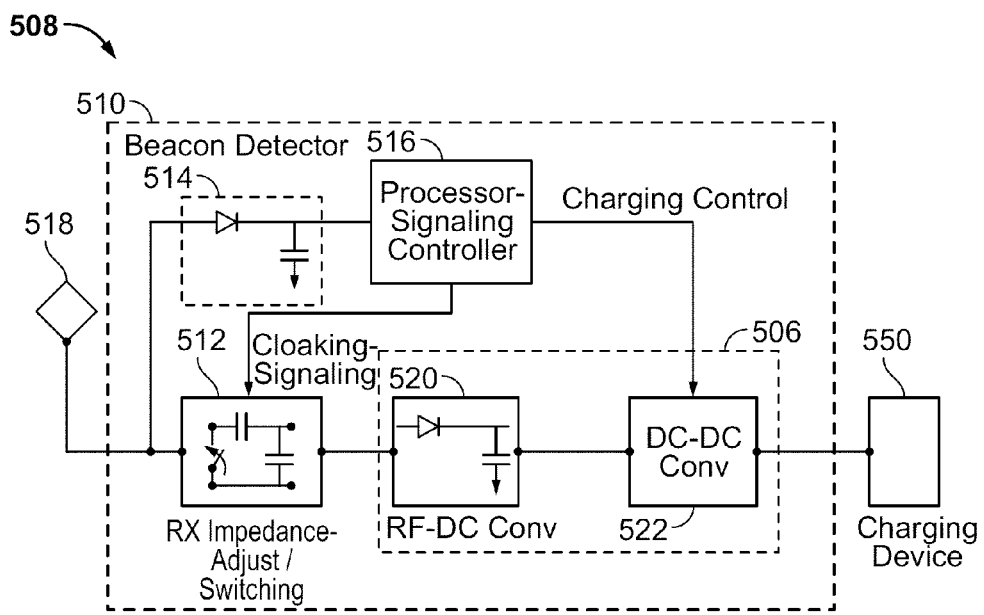
FIG. 5 is a functional block diagram of a receiver that may be used in the wireless power transfer system of FIG. 1, in accordance with exemplary embodiments of the invention.

FIG. 5 is a functional block diagram of a receiver 508 that may be used in the wireless power transfer system of FIG. 1, in accordance with exemplary embodiments of the invention. The receiver 508 includes receive circuitry 510 that may include a receive coil 518. Receiver 508 further couples to device 550 for providing received power thereto. It should be noted that receiver 508 is illustrated as being external to device 550 but may be integrated into device 550. Energy may be propagated wirelessly to receive coil 518 and then coupled through the rest of the receive circuitry 510 to device 550. By way of example, the charging device may include devices such as mobile phones, portable music players, laptop computers, tablet computers, computer peripheral devices, communication devices (e.g., Bluetooth devices), digital cameras, hearing aids (an other medical devices), and the like.

Receive coil 518 may be tuned to resonate at the same frequency, or within a specified range of frequencies, as transmit coil 414 (FIG. 4). Receive coil 518 may be similarly dimensioned with transmit coil 414 or may be differently sized based upon the dimensions of the associated device 550. By way of example, device 550 may be a portable electronic device having diametric or length dimension smaller that the diameter of length of transmit coil 414. In such an example, receive coil 518 may be implemented as a multi-turn coil in order to reduce the capacitance value of a tuning capacitor (not shown) and increase the receive coil's impedance. By way of example, receive coil 518 may be placed around the substantial circumference of device 550 in order to maximize the coil diameter and reduce the number of loop turns (i.e., windings) of the receive coil 518 and the inter-winding capacitance.

Receive circuitry 510 may provide an impedance match to the receive coil 518. Receive circuitry 510 includes power conversion circuitry 506 for converting a received RF energy source into charging power for use by the device 550. Power conversion circuitry 506 includes an RF-to-DC converter 520 and may also in include a DC-to-DC converter 522. RF-to-DC converter 520 rectifies the RF energy signal received at receive coil 518 into a non-alternating power with an output voltage represented by $V_{rect}$. The DC-to-DC converter 522 (or other power regulator) converts the rectified RF energy signal into an energy potential (e.g., voltage) that is compatible with device 550 with an output voltage and output current represented by $V_{out}$ and $I_{out}$. Various RF-to-DC converters are contemplated, including partial and full rectifiers, regulators, bridges, doublers, as well as linear and switching converters.

Receive circuitry 510 may further include RX impedance adjustment and switching circuitry 512. The RX impedance adjustment and switching circuit may be configured to adjust an impedance of the receive circuitry 510 based on an impedance of the receive coil 518 to improve efficiency during power transfer. Further, the RX impedance adjustment and switching circuitry ma be configured to connect receive coil 518 to the power conversion circuitry 506 or alternatively disconnect the power conversion circuitry 506. Disconnecting receive coil 518 from power conversion circuitry 506 not only suspends charging of device 550, but also changes the "load" as "seen" by the transmitter 404 (FIG. 2).

As disclosed above, transmitter 404 includes load sensing circuit 416 that may detect fluctuations in the bias current provided to transmitter driver circuit 424. Accordingly, transmitter 404 has a mechanism for determining when receivers are present in the transmitter's near-field.

When multiple receivers 508 are present in a transmitter's near-field, it may be desirable to time-multiplex the loading and unloading of one or more receivers to enable other receivers to more efficiently couple to the transmitter. A receiver 508 may also be cloaked in order to eliminate coupling to other nearby receivers or to reduce loading on nearby transmitters. This "unloading" of a receiver is also known herein as a "cloaking." Furthermore, this switching between unloading and loading controlled by receiver 508 and detected by transmitter 404 may provide a communication mechanism from receiver 508 to transmitter 404 as is explained more fully below. Additionally, a protocol may be associated with the switching that enables the sending of a message from receiver 508 to transmitter 404. By way of example, a switching speed may be on the order of 100 μsec.

In an exemplary embodiment, communication between the transmitter 404 and the receiver 508 refers to a device sensing and charging control mechanism, rather than conventional two-way communication (i.e., in band signaling using the coupling field). In other words, the transmitter 404 may use on/off keying of the transmitted signal to adjust whether energy is available in the near-field. The receiver may interpret these changes in energy as a message from the transmitter 404. From the receiver side, the receiver 508 may use tuning and de-tuning of the receive coil 518 to adjust how much power is being accepted from the field. In some cases, the tuning and de-tuning may be accomplished via the switching circuitry 512. The transmitter 404 may detect this difference in power used from the field and interpret these changes as a message from the receiver 508. It is noted that other forms of modulation of the transmit power and the load behavior may be utilized.

Receive circuitry 510 may further include signaling detector and beacon circuitry 514 used to identify received energy fluctuations, that may correspond to informational signaling from the transmitter to the receiver. Furthermore, signaling and beacon circuitry 514 may also be used to detect the transmission of a reduced RF signal energy (i.e., a beacon signal) and to rectify the reduced RF signal energy into a nominal power for awakening either un-powered or power-depleted circuits within receive circuitry 510 in order to configure receive circuitry 510 for wireless charging.

Receive circuitry 510 further includes processor 516 for coordinating the processes of receiver 508 described herein including the control of the RX impedance adjustment and switching circuitry 512 described herein. Cloaking of receiver 508 may also occur upon the occurrence of other events including detection of an external wired charging source (e.g., wall/USB power) providing charging power to device 550. Processor 516, in addition to controlling the cloaking of the receiver, may also monitor beacon circuitry 514 to determine a beacon state and extract messages sent from the transmitter 404. Processor 516 may also adjust the DC-to-DC converter 522 for improved performance.

Figure 6:
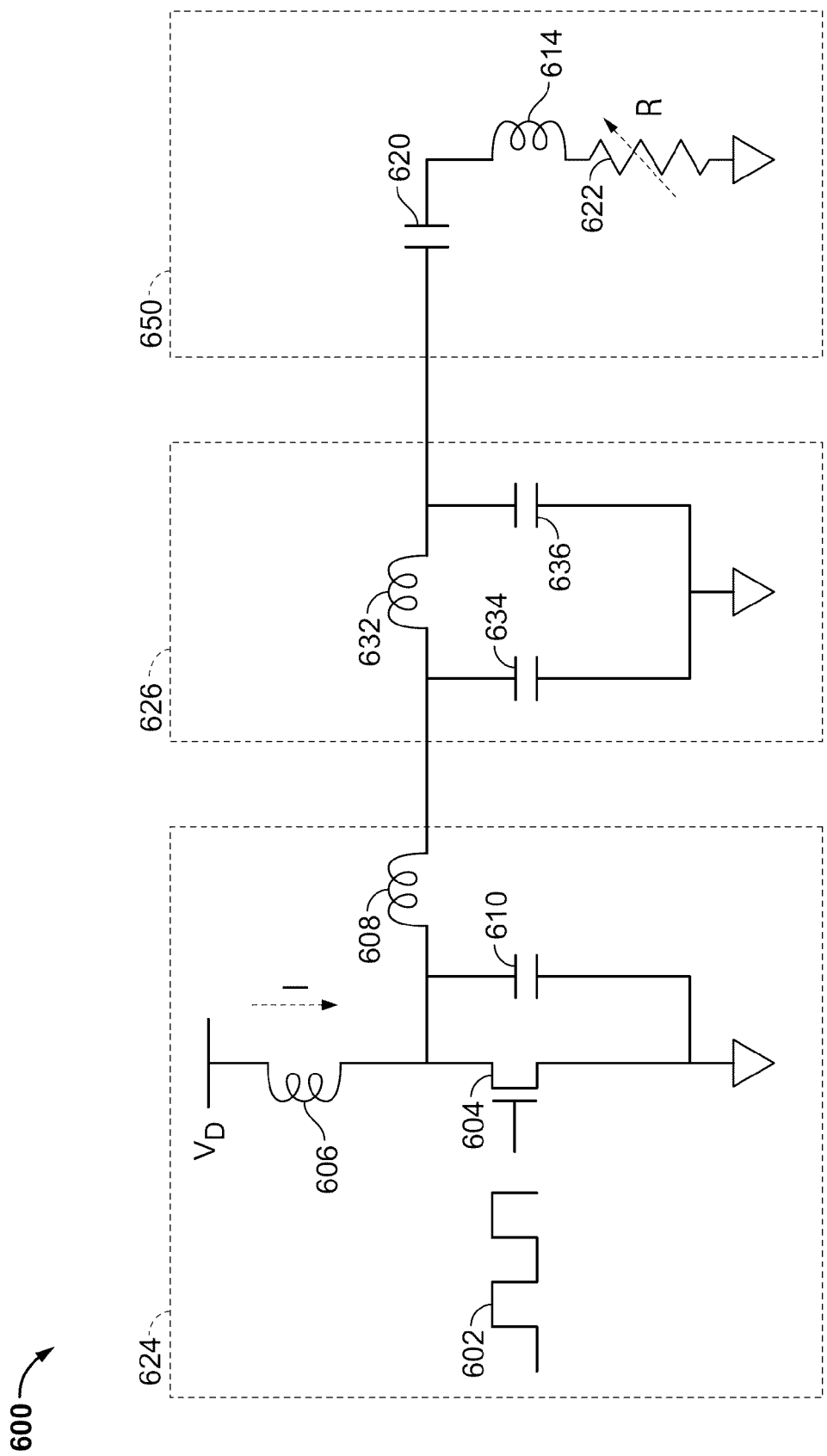
FIG. 6 is a schematic diagram of a portion of transmit circuitry that may be used in the transmit circuitry of FIG. 4.

FIG. 6 is a schematic diagram of a portion of transmit circuitry 600 that may be used in the transmit circuitry 405 of FIG. 4. The transmit circuitry 600 may include a driver circuit 624 as described above in FIG. 4. As described above, the driver circuit 624 may be a switching amplifier that may be configured to receive a square wave and output a sine wave to be provided to the transmit circuit 650. In some cases the driver circuit 624 may be referred to as an amplifier circuit. The driver circuit 624 is shown as a class E amplifier; however, any suitable driver circuit 624 may be used in accordance with embodiments of the invention. The driver circuit 624 may be driven by an input signal 602 from an oscillator 423 as shown in FIG. 4. The driver circuit 624 may also be provided with a drive voltage $V_D$ that is configured to control the maximum power that may be delivered through a transmit circuit 650. The drive voltage $V_D$ may be the DC bias of an amplifier. For example, the drive voltage $V_D$ may be the DC bias of a Class E amplifier. The drive voltage $V_D$ may also be the DC bias of multiple amplifiers. Based on the drive voltage, the driver circuit 624 is configured to generate a driving signal to drive a transmit circuit 626 including a transmit coil 614 to generate the wireless power transfer field. According to some embodiments, to eliminate or reduce harmonics, the transmit circuitry 600 may include a filter circuit 626. The filter circuit 626 may be a three pole (capacitor 634, inductor 632, and capacitor 636) low pass filter circuit 626.

The signal output by the filter circuit 626 may be provided to the transmit circuit 650 including the transmit coil 614. The transmit circuit 650 may include a series resonant circuit having a capacitance (e.g., corresponding to capacitor 620) and inductance (e.g., that may be due to the inductance or capacitance of the coil or to an additional capacitor component) that may resonate at a frequency of the filtered signal provided by the driver circuit 624. The load of the transmit circuit 650 may be represented by the variable resistor 622. The load may be a function of a wireless power receiver 508 that is positioned to receive power from the transmit circuit 650.

Figure 7A:
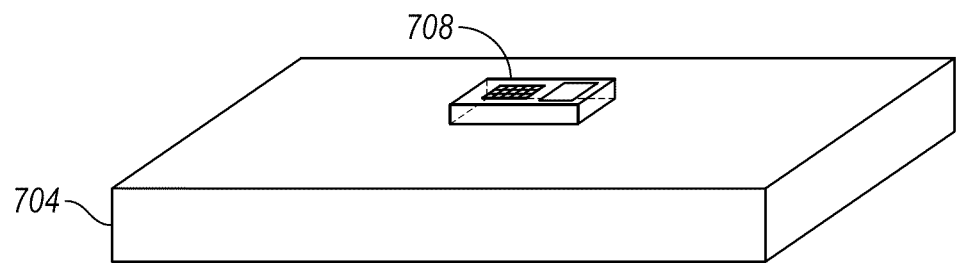
FIG. 7A illustrates a wireless power transmitter and a single wireless power receiver in a wireless power system.
Figure 7B:
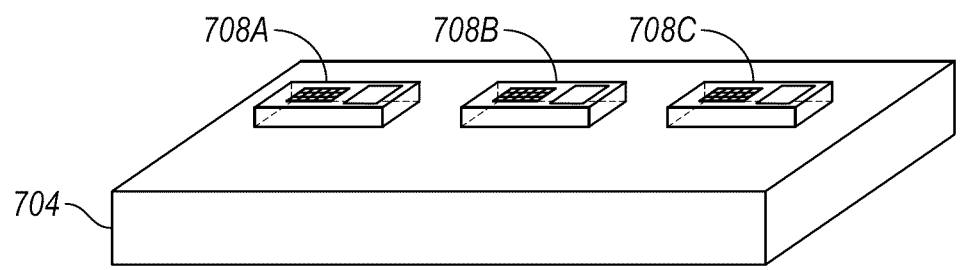
FIG. 7B illustrates a wireless power transmitter and a plurality of wireless power receivers in a wireless power system.

FIG. 7A illustrates a wireless power transmitter and a single wireless power receiver in a wireless power system. As shown in FIG. 7A, the wireless power transmitter 704 may be configured to generate a wireless power transfer field, and the wireless power receiver 708 is configured to receive power via the wireless power transfer field to power or charge an associated load. FIG. 7B illustrates a wireless power transmitter and a plurality of wireless power receivers in a wireless power system. As shown in FIG. 7B, the wireless power transmitter 704 is configured to generate a wireless power transfer field, and each of the wireless power receivers 7088, 708B, and 708C are configured to receive power from the wireless power transfer field based on corresponding load of each of the receivers. As discussed above, loosely coupled wireless power systems may be designed to power multiple receivers from a single transmitter. The one-to-many transmitter to receiver relationship presents some designs challenges to design a system that distributes the appropriate amount of power, at the appropriate voltage, to each wireless power receiver 708A, 708B, and 708C.

Figure 8A:
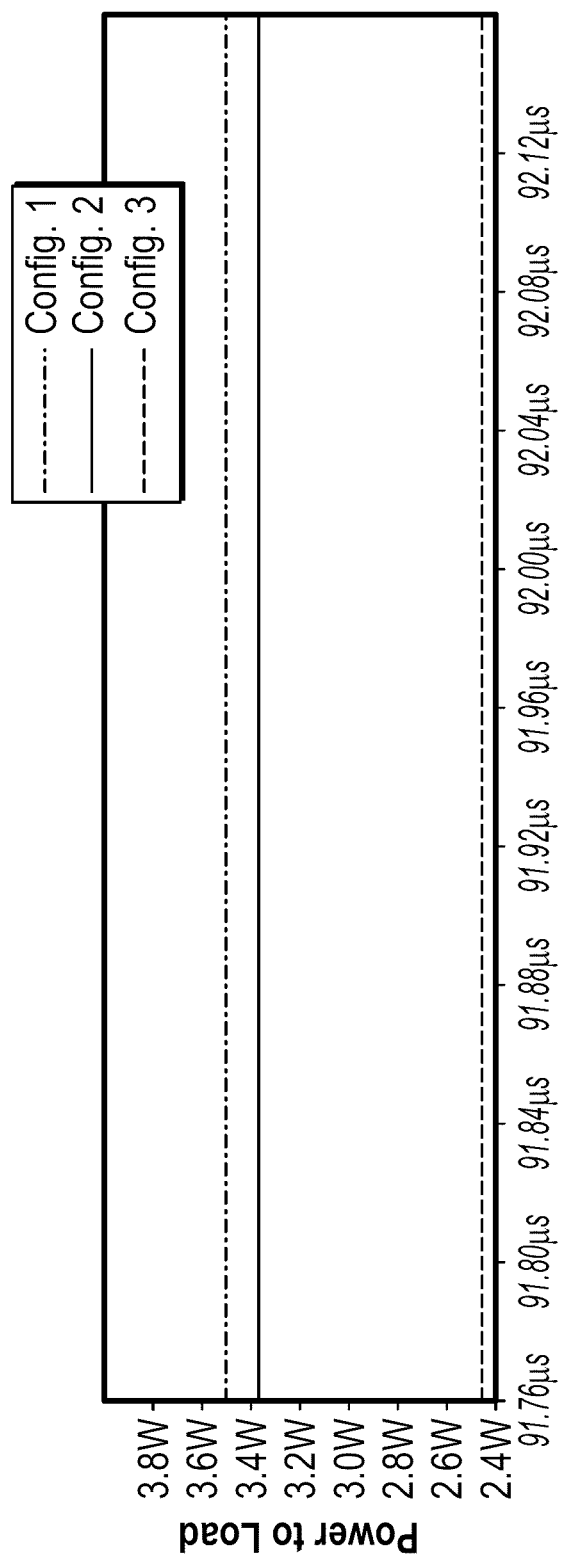
FIG. 8A is a plot showing output power from a wireless power receiver to a load according based on various loading conditions presented to a wireless power transmitter.

FIG. 8A is a plot showing output power from a wireless power receiver to a load according based on various loading conditions presented to a wireless power transmitter. The plot of FIG. 8A will be explained with reference to a wireless power transmitter 704 and wireless power receivers 708A-708C as described above with reference to FIGS. 7A-7B. A wireless power receiver, for example, wireless power receiver 708A, receives power at a power level that varies depending on the number of loads being powered by the wireless field generated by the wireless power transmitter 704, and the amount of power that each load requires. For example, in a first configuration, a first wireless power receiver 708A is the only wireless power receiver coupled to the wireless field generated by the wireless power transmitter 704. The first wireless power receiver 708A may be coupled to a 25Ω load, and delivers approximately 3.5 W to the load as shown in FIG. 8A. In a second configuration, the first wireless power receiver 708A is coupled to the wireless field and connected to a 25Ω load, a second wireless power receiver 708B and a third wireless power receiver 708C are also coupled to the wireless field and are each coupled to a 70Ω load. In the second configuration, the first wireless power receiver 708A delivers approximately 3.35 W to the load as shown in FIG. 8A. In a third configuration, the first wireless power receiver 708A is coupled to the wireless field and connected to a 25Ω load and the second and third wireless power receivers 708B and 708C are coupled to the wireless field and coupled to a 25Ω load. In the third configuration, first wireless power receiver 708A delivers approximately 2.45 W to the load as shown in FIG. 8A. Therefore, as illustrated, the output power of the first wireless power receiver 708A is substantially different in the first, second, and third configurations.

Figure 8B:
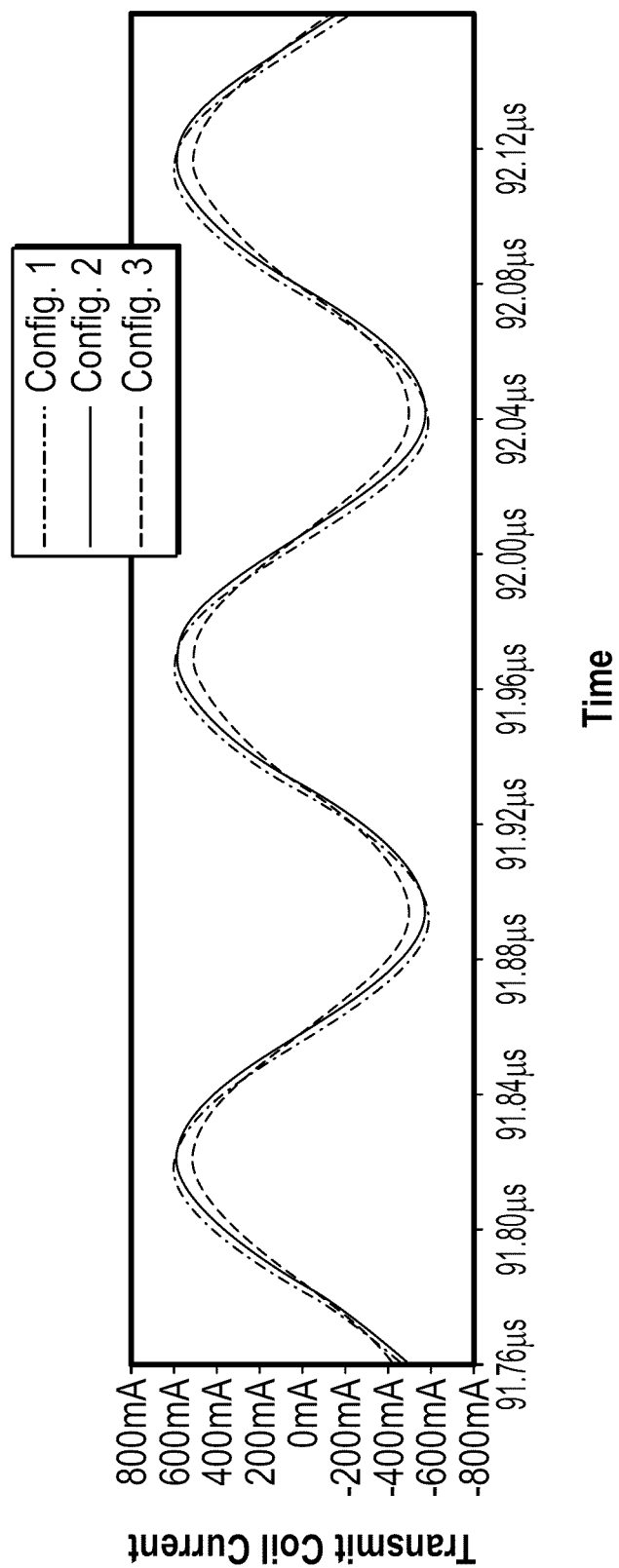
FIG. 8B is a plot showing current through a wireless power transmit coil based on various loading conditions presented to a wireless power transmitter.

FIG. 8B is a plot showing current through a wireless power transmit coil based on various loading conditions presented to a wireless power transmitter. As shown in FIG. 8B, in the first configuration, the current through a wireless power transmit coil of the wireless power transmitter 704 corresponds to a sinusoidal wave having a peak magnitude of approximately 600 mA. In the second configuration, the current through the wireless power transmit coil of the wireless power transmitter 704 corresponds to a sinusoidal wave having a peak magnitude of approximately 590 mA. In the third configuration, the current through the wireless power transmit coil of the wireless power transmitter 704 corresponds to a sinusoidal wave having a peak magnitude of approximately 500 mA.

Figure 8D:
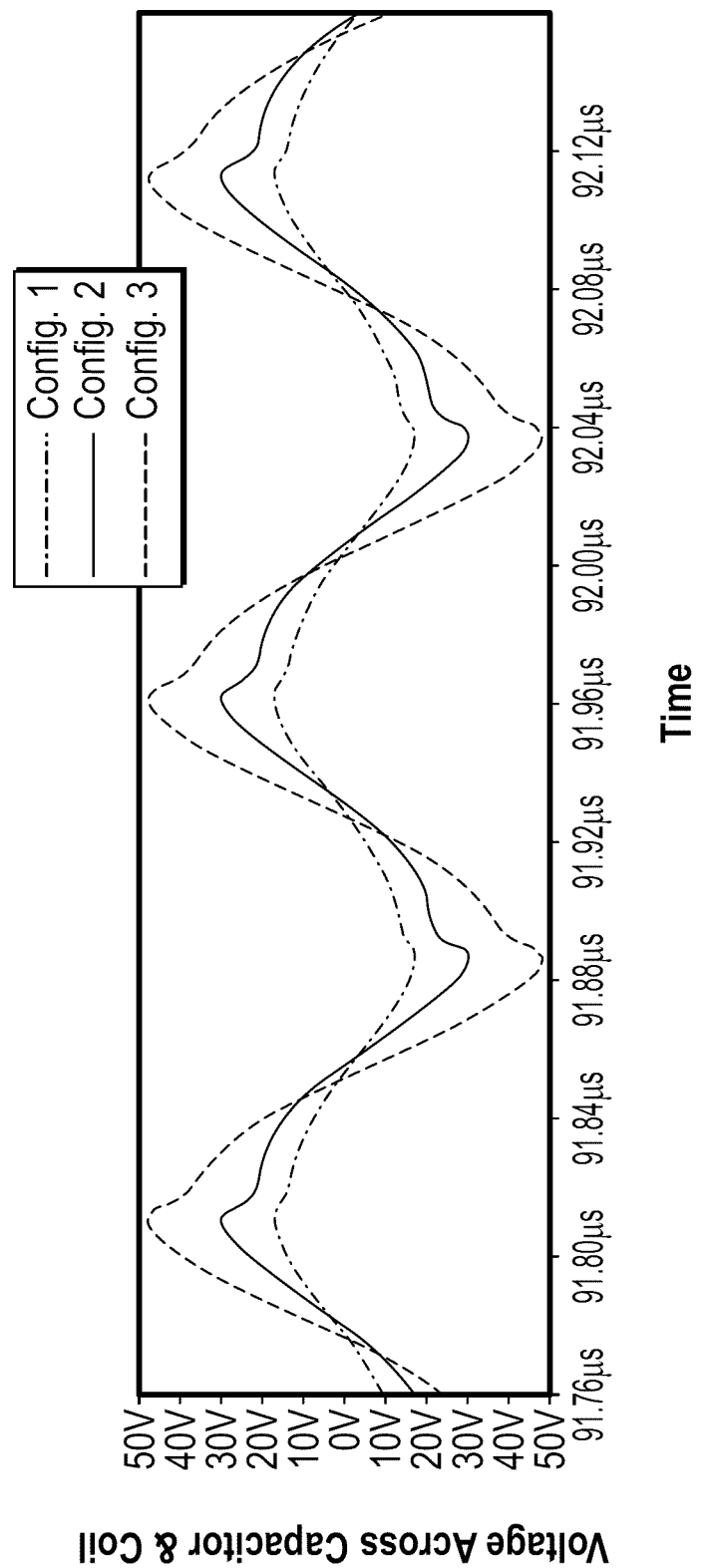
FIG. 8D is a plot showing voltage across a resonant circuit based on various loading conditions presented to a wireless power transmitter.

FIG. 8C is a plot showing voltage across a wireless power transmit coil based on various loading conditions presented to a wireless power transmitter. For example, the plot shown in FIG. 8C may correspond to a voltage across a transmit coil 614 as illustrated in FIG. 6. As shown in FIG. 8C, the voltage in each of the first, second, and third configurations varies within a range of about 30V. To clearly illustrate the voltage variation over a smaller magnitude of voltage values, the voltage may be measured across a resonant circuit, such as across the series connected capacitor 620 and transmit coil 614 of FIG. 6. FIG. 8D is a plot showing voltage across a resonant circuit based on various loading conditions presented to a wireless power transmitter. For example, the plot shown in FIG. 8D illustrates the variation between the voltage level in a first configuration, having a peak magnitude of about 17V, the voltage level in a second configuration, having a peak magnitude of about 30V, and the voltage level in a third configuration, having a peak magnitude of about 48V. As shown, the voltage varies between the three configurations within a range of about 30V.

While described in the various examples herein with reference to a wireless power system including three wireless power receivers (e.g., wireless power receivers 708A, 708B, and 708C), the wireless power system may include any number of wireless power receivers having the same or different loads.

To compensate for variation in loading conditions and the effect on output power from a wireless power receiver, a system may incorporate a feedback mechanism from a wireless power receiver to a wireless power transmitter. For example, each wireless power receiver 708A-708C may communicate a signal to the wireless power transmitter 704 to increase or decrease the power level of the wireless field generated by the wireless power transmitter 704 in order to meet the voltage and power requirements of each of the wireless power receivers 708A-708C. However, since signals are first measured or determined by the wireless power receivers 708A-708C and transmitted to the wireless power transmitter 704, the response of the wireless power transmitter 704 may be delayed. For example, the response time of the wireless power transmitter 704 may be on the order of about 10 seconds. As a result, each of the wireless power receivers 708A-708C may be designed to withstand a range of voltage levels received to prevent damage during wireless power reception in varying loading conditions. Further, challenges may be presented in providing a wireless power transmitter 704 which is configured to balance the various demands of each of the wireless power receivers 704 based on computation and modeling of the system. Further, the determination of the parameters for a wireless field may be based on a number of variable conditions, such as the number of wireless power receivers, the position and orientation of each wireless power receiver, the power and voltage requirements of each wireless power receiver, and the an optimal performance criteria of the wireless power transmitter. To improve interoperability, wireless power receivers may be designed to accommodate a wide range of conditions. However, efficiency and robustness may be reduced based on such a design. Further, each design may be verified in a wide range of operating conditions. As a result, a substantial design verification test may be used which may significantly extend, and increases the cost of, the product development cycle.

According to some embodiments, an internal or local feedback system may be used to adjust a wireless power transfer field. As described herein, an internal or local feedback signal is defined as a feedback signal based on a measurement performed at the wireless power transmitter. The internal or local feedback may be different than, or be used in addition to, a feedback signal based on a message communicated from one or more wireless power receivers as will be described in greater detail below.

Figure 9:
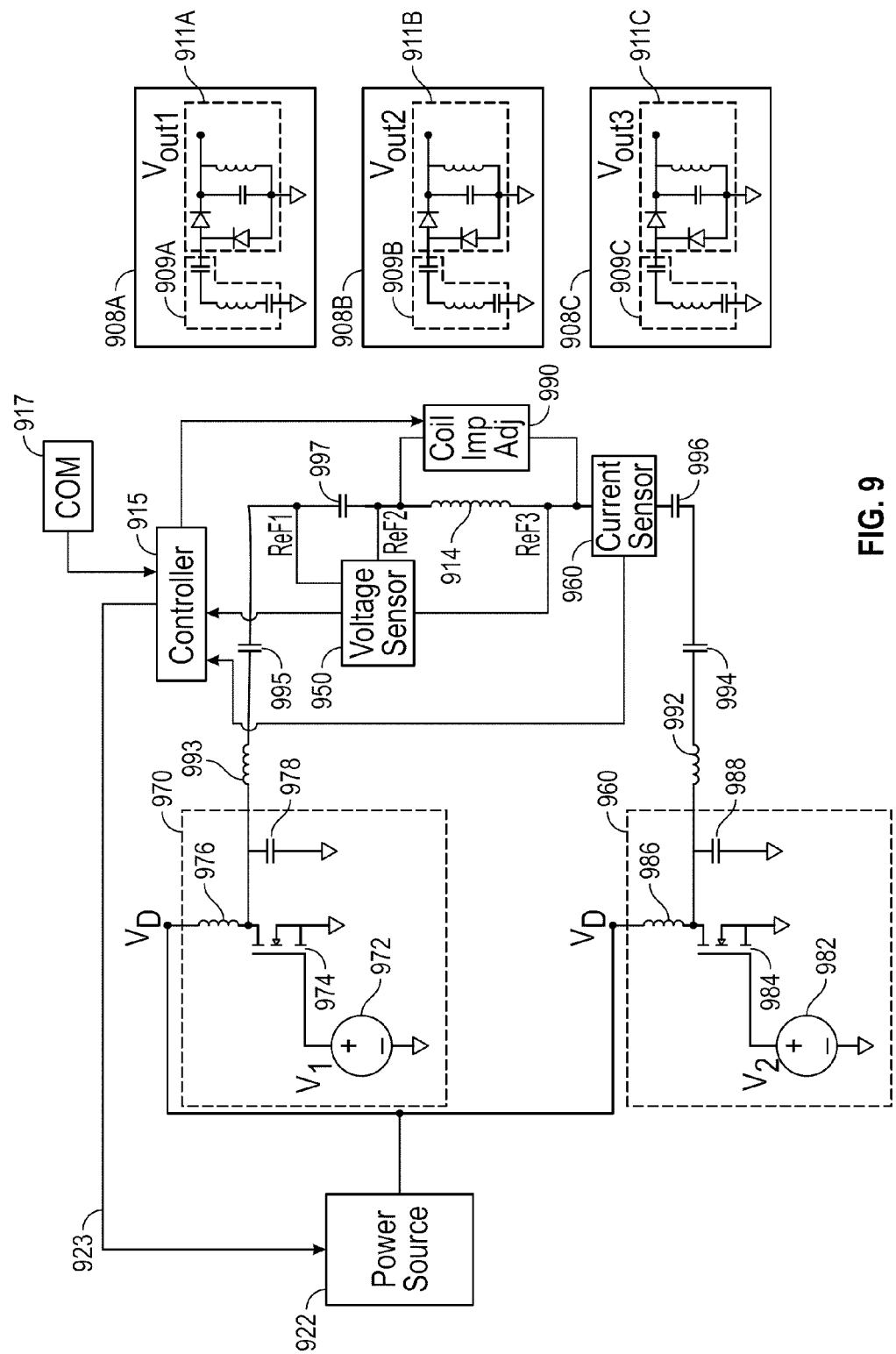
FIG. 9 is an example of a wireless power transmitter configured to transfer power to a plurality of wireless power receivers according to some embodiments.

FIG. 9 is an example of a wireless power transmitter configured to transfer power to a plurality of wireless power receivers according to some embodiments. As shown in FIG. 9, three wireless power receivers 908A, 908B, and 908C may be configured to be coupled to a wireless field to receive power there-from. Each of the wireless power receivers 908A-908C may include a resonant circuit (e.g., resonant circuits 909A-909C) having a wireless power receiver coil coupled to a one or more capacitors. The resonant circuits 909A-909C may each have an inductance and capacitance within a wide range of values. In one example, the capacitance of each of the resonant circuits 909A-909C is about 2.4 pF and the inductance of each of the resonant circuits 909A-909C is about 2.6 μH. The resonant circuits 909A-909C or each wireless power receiver 908A-908C are coupled to a rectification circuit (e.g., rectification circuits 911A-911C) to output a voltage at a voltage level for powering or charging a corresponding load (not shown). For example, the first wireless power receiver 908A may be configured to output a voltage at a voltage level $V_{out1}$, the second wireless power receiver 908B may be configured to output a voltage at a voltage level $V_{out2}$, and the third wireless power receiver 908C may be configured to output a voltage at a voltage level $V_{out3}$. The voltage levels $V_{out1}$, $V_{out2}$, and $V_{out3}$ may be set to meet the load requirements coupled to each of the wireless power receivers 908A-908C.

Further, as shown in FIG. 9, a power source 922 is configured to provide a voltage signal $V_D$ to each of a first and second driving circuit 970 and 980. For example, each of the first and second driving circuit's 970 and 960 may be configured as class E amplifiers which are connected to drive a wireless power transmit coil 914 in a push-pull configuration. The wireless power transmit coil 914 may have an inductance within a wide range of values. In one example, the inductance of the transmit coil 914 may be about 7.5 μH. The first driving circuit 970 includes a first voltage source 972 configured to generate a voltage signal at a voltage level $V_1$. The output of the first voltage source 972 is coupled to a first switching circuit 974. The first switching circuit 974 is coupled to a voltage signal ($V_D$) terminal input to receive a power signal through an inductor 976. The output of the first switching circuit 974 is coupled to a wireless power field generating circuit through the first bypass capacitor 978. Based on the relative value of voltage signal $V_D$ and the voltage level $V_1$, the first driving circuit 970 is configured to inject current into the wireless power field generating circuit.

The second driving circuit 980 include similar components and functions similar to the first driving circuit 970. For example, as shown in FIG. 9, the second driving circuit 980 includes a second voltage source 982 configured to generate a voltage signal at a voltage level $V_2$. The second voltage source 982 is coupled to second switching circuit 984. The second switching circuit 984 is coupled to a voltage signal ($V_D$) terminal input to receive power signal through an inductor 986. The output of the second switching circuit 984 is coupled to wireless power field generated circuit through the second bypass capacitor 988. Based on the relative value of voltage signal $V_D$ and the voltage level $V_2$, the second driving circuit 980 is configured to inject current into the wireless power field generating circuit.

A current from the first and second driving circuit and 970 and 980 is received by a wireless power transmit coil to generate the wireless power transfer field. The wireless power transmit coil 914 is coupled to each of the first and second driving circuit 970 and 980 through first and second inductive components 992 and 993, and first through fourth capacitive components 994-997. The capacitive components may have a capacitance within a wide range of values. In one example, the combined capacitance of the capacitive components 994-997 may be about 73 pF. The inductive components 992, 993, and capacitive components 994-997 may be coupled to the wireless power transmit coil 914 to form a resonant circuit. As shown in FIG. 9, the wireless power transmit coil 914 is also coupled to coil impedance adjustment circuit 990, a current sensor 960, and a voltage sensor 950. While shown to include each of a current sensor 960, voltage sensor 950, and coil impedance adjustment circuit 990, the transmit circuitry may also include any combination of these components including, for example, only one of these components. Further, various components illustrated and/or described in FIG. 9 and additional components may be included or excluded based on the functionality of a wireless power transmitter.

As shown in FIG. 9, the coil impedance adjustment circuit 990 may be configured to adjust the impedance of the wireless power transmit coil based on a signal received from controller 915 in order to control the amount of current flowing through the wireless power transmit coil 914. The current sensor 916 may be coupled to the wireless power transmit coil 914 in series, and may be configured to detect the level of current passing through the wireless power transmit coil 914 and communicate the sensed level of current to the controller 915. The voltage sensor 950 may be configured to detect a voltage level at the input of wireless power transmit coil 914 and communicate the detected voltage level to the controller 915. Additionally, or alternatively, the voltage sensor 950 may be configured to detect a voltage level (ReF1, ReF2) across an impedance (e.g., capacitive component 997 as shown in FIG. 9) and communicate the detected voltage difference to the controller 915. The controller 915 may be configured to determine a current through the wireless power transmit 914 based on the detected voltage levels (e.g., ReF1 and ReF2). Further, the voltage sensor 950 may be configured to detect a voltage level across the transmit coil 914 (e.g., a voltage equal to ReF2-ReF3) and transmit the detected voltage level to the controller 915. Other voltage measurements and current measurements may also be performed and provided to the controller 915, and the illustrated examples of FIG. 9 are provided only as example measurement positions. The controller may be configured to adjust a parameter of the transmit circuitry, for example by adjustment of one or more of an effective impedance of the transmit coil (e.g. through control of the coil impedance adjustment circuit 990) and the level of the drive voltage $V_D$ to maintain a constant current through the coil 914 or a constant voltage at the transmit coil 914.

According to some embodiments, the controller 915 may be configured to generate an internal or local feedback signal to adjust one of the current through the wireless power transmit coil 914 and the voltage at the input of the wireless power transmit coil 914. For example, the controller 915 may also be configured to provide a feedback signal 923 (e.g., a local or internal feedback signal) for controlling the voltage level of the power signal generated by the power source 922. Additionally, or alternatively, the controller 915 may be configured to generate a feedback signal (e.g., a local or internal feedback signal) to adjust the effective impedance of the wireless power transmit coil 914 by adjusting the impedance of the coil impedance adjustment circuit 990. The controller 915 may be configured to control a set of switches of the coil impedance adjustment circuit 990 which are configured to connect one or more reactive and resistive elements in parallel or series with the wireless power transmit coil 914. If the current measurement is lower than a predetermined threshold the switches will be configured to reduce the impedance of the primary winding. For example, if the current measurement is higher than a predetermined threshold, the switches will be configured to increase the impedance of the wireless power transmit coil 914. If the current measurement is equal to the predetermined threshold, the switches may be configured such that impedance of the wireless power transmit coil is maintained. In this way, the controller 915 may be configured to maintain constant level of current through the wireless power transmit coil 914 in the presence of a plurality of wireless power receivers 908A-908C and different loading conditions as discussed above. Alternatively, the controller 915 may be configured to maintain constant voltage level at the input of the wireless power transmit coil 914 in the presence of a plurality of wireless power receivers 908A-908C and different loading conditions as discussed above.

Further, a wireless power transmitter may include a communication module 917 coupled to the controller 915. The communication module 917 may be configured to receiver communication signals from one or more of the wireless power receivers 908A-908C. Based on the communication signals, the controller 915 may also determine an adjustment of one of the current through wireless power transmit coil 914 and a voltage at the input of the wireless power transmit coil. For example, the wireless power receivers 908A-908C may provide feedback to the controller 915 based on the power received by each of the wireless power receivers 908A-908C and the requirements of each of the wireless power receivers 908A-908C. In some embodiments, the controller 915 may use the communication signals received from the wireless power receivers 908A-908C to adjust a set-point for one of the current and voltage of the wireless power transmit coil 914. The controller 915 may also use the local or internal feedback (e.g., based on signals received from the voltage sensor 950 and current sensor 960) to adjust one of the voltage and current of the wireless power transmit coil 914. For example, the controller 915 may be configured to perform a coarse adjustment based on signals received from the wireless power receivers 908A-908C, and a fine adjustment based on signals received from the voltage sensor 950 or the current sensor 960.

Figure 10:
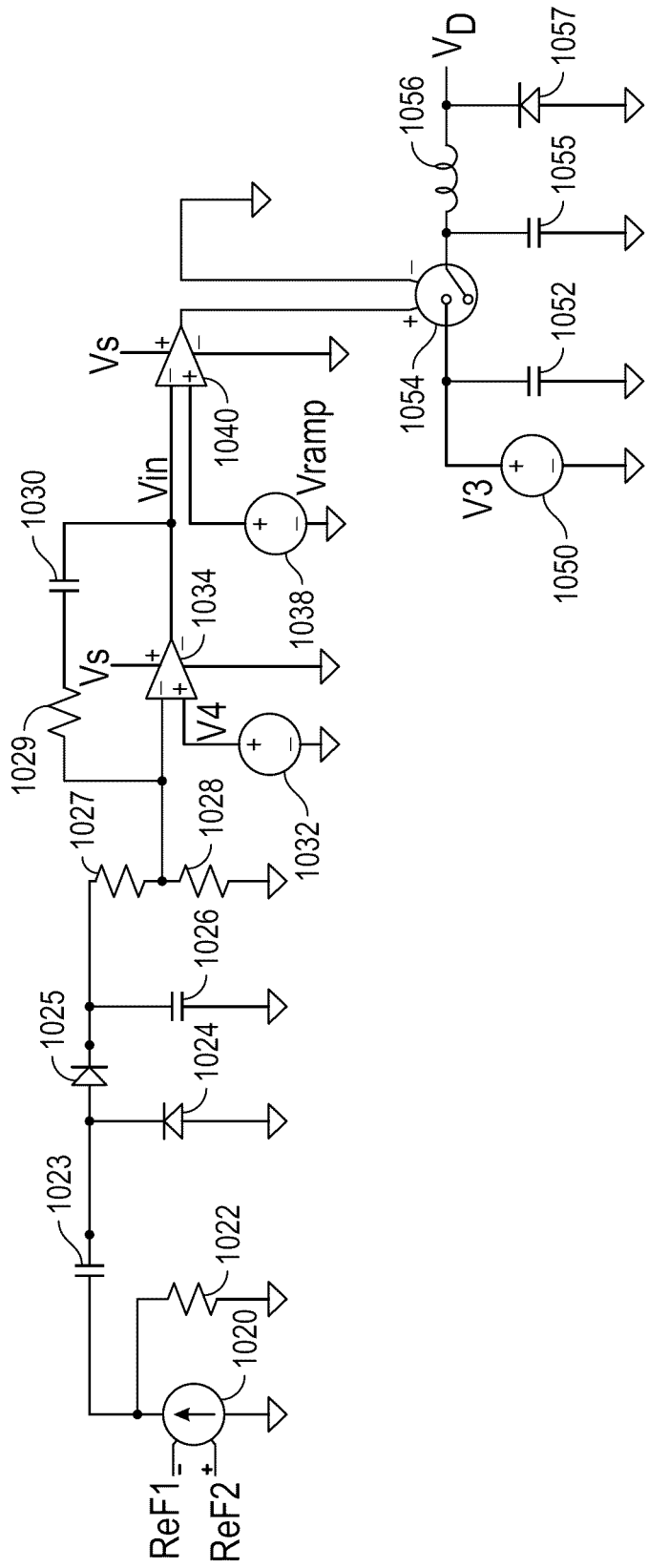
FIG. 10 illustrates an example circuit for compensation and generation of a power signal to a wireless power transmitter according to some embodiments.

FIG. 10 illustrates an example circuit for compensation and generation of a power signal to a wireless power transmitter according to some embodiments. The circuit shown in FIG. 10 is one example of a circuit that may be used as a power source (e.g., power source 922 of FIG. 9 above) for a wireless power transmitter. According to the embodiment shown in FIG. 10, a current through the wireless power transmit coil 914 is converted into a proportional DC voltage. The circuit of FIG. 10 includes a compensation circuit including a current source 1020 configured to supply a current at a level based on a signal received from the wireless power transmitter controller 915. The current source 1020 may be connected in parallel to a resistor 1022 and in series with a capacitor 1023.

The current source 1020 may be configured to generate a current based on the first and second voltage detection levels ReF1 and ReF2 measured by the voltage sensor 950 as discussed above with reference to FIG. 9. For example, as the voltage difference ReF1-ReF2 increases, a current generated by the current source 1020 may decrease, and as the voltage difference ReF1-ReF2 decreases, a current generated by the current source 1020 may increase. The current may be transmitted through capacitor 1023 as a time varying voltage signal to a rectification circuit including a first diode 1024, a second diode 1025, and capacitor 1026. The output of the rectification circuit (e.g., the output of the second diode 1025) may be provided to a voltage dividing network including a first resistor 1027 and a second resistor 1028. The output of the voltage divider may be provided to an oscillator including an operational amplifier (op-amp) circuit 1034. The op-amp 1034 may include a voltage source 1032 configured to generate a reference voltage level $V_4$ coupled to positive terminal and a resistor 1029 in series with a capacitor 1030 coupled to a negative terminal and an output terminal as shown in FIG. 10. The op-amp circuit 1034 may be configured to function as a comparator which compares the voltage at the output of the diode 1025 to the reference voltage level $V_4$ to generate a comparison signal at an output voltage level Vin. The output voltage level Vin of the compensation circuit may be provided to a buck converter circuit as an input to a negative terminal of an op-amp 1040. The op-amp 1040 may be configured to receive a saw-tooth wave voltage signal Vramp from a voltage source 1038. Based on a comparison of the voltage signal Vin and the saw-tooth wave, the op-amp 1040 may be configured to generate a periodic switching signal (e.g. a pulse width modulated voltage signal) with a frequency which is equal to the frequency of the saw-tooth ramp signal and a duty cycle which is proportional to the voltage signal Vin to drive a switch 1054. The switch 1054 includes a first terminal coupled to a voltage source 1050 through a bypass capacitor 1052. The voltage source 1050 may be configured to generate a voltage signal at a voltage level $V_3$. When the switch 1054 is in a closed state, a voltage at a voltage level $V_3$ is applied to the rectification circuit including capacitor 1055, inductor 1056, and diode 1057 to generate the voltage signal $V_D$ for powering the first and second driving circuits 970 and 980 as discussed above with reference to FIG. 9. The output voltage $V_D$ of the converter circuit of FIG. 10 is proportional to the duty cycle of the pulse width modulated output and is provided as a DC bias of the first and second driver circuit (e.g., driver circuits 970 and 980) as discussed above. As a result, the output voltage of the converter circuit is proportional to the wireless power transmit coil 914 current.

Figure 11A:
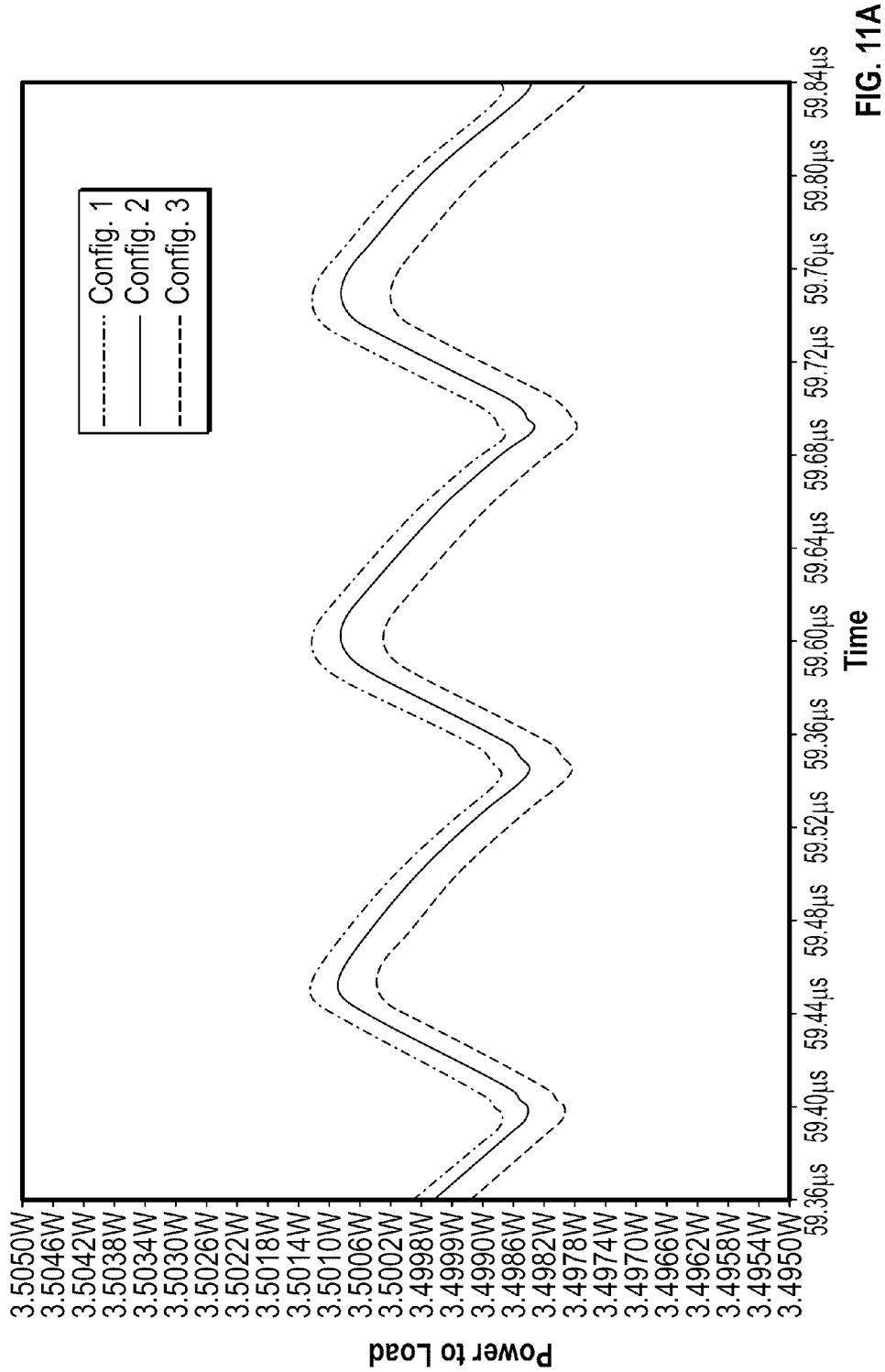
FIG. 11A is a plot showing output power output power from a wireless power receiver to a load based on various loading conditions presented to a wireless power transmitter according to some embodiments.

FIG. 11A is a plot showing output power output power from a wireless power receiver to a load based on various loading conditions presented to a wireless power transmitter according to some embodiments. The plot of FIG. 11A is based on the system described with FIG. 9. The wireless power receivers 908A-908C may have loading conditions similar to those described above with reference to a wireless power transmitter 704 and wireless power receivers 708A-708C and the corresponding plots shown in FIGS. 8A-8C. For example, in a first configuration, a first wireless power receiver 908A is the only wireless power receiver coupled to the wireless field. The first wireless power receiver 908A may be coupled to a 25Ω load, and delivers approximately 3.5 W to the load as shown in FIG. 11A. In a second configuration, the first wireless power receiver 908A is coupled to the wireless field and connected to a 25Ω load, the second wireless power receiver 908B and the third wireless power receiver 908C are also coupled to the wireless field and are each coupled to a 70Ω load. In the second configuration, the first wireless power receiver 908A delivers approximately 3.5 W to the load as shown in FIG. 11A. In a third configuration, the first wireless power receiver 908A is coupled to the wireless field and connected to a 25Ω load and the second and third wireless power receivers 908B and 908C are coupled to the wireless field and to a 25Ω load. In the third configuration, first wireless power receiver 908A delivers approximately 3.5 W to the load as shown in FIG. 8A. Therefore, as illustrated, the output power of the first wireless power receiver 908A is substantially the same in the first, second, and third configurations.

Figure 11B:
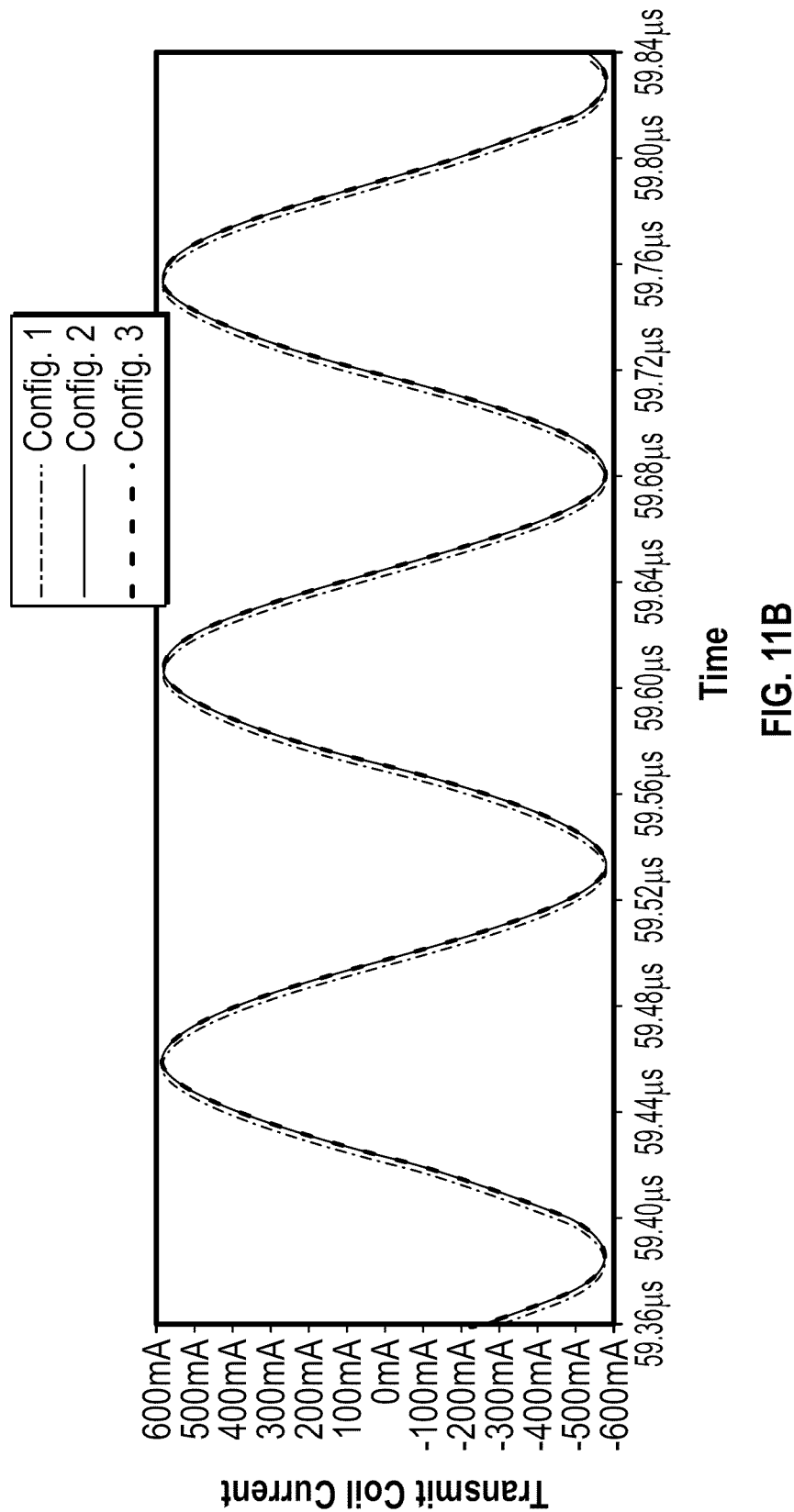
FIG. 11B is a plot showing current through a wireless power transmit coil based on various loading conditions presented to a wireless power transmitter according to some embodiments.

FIG. 11B is a plot showing current through a wireless power transmit coil based on various loading conditions presented to a wireless power transmitter according to some embodiments. As shown in FIG. 11B, in each of the first, second, and third configurations, the current through a wireless power transmit coil 914 corresponds to a sinusoidal wave having a peak magnitude of approximately 600 mA. Therefore, as shown, the current through the wireless power transmit coil 914 is substantially maintained.

Figure 11C:
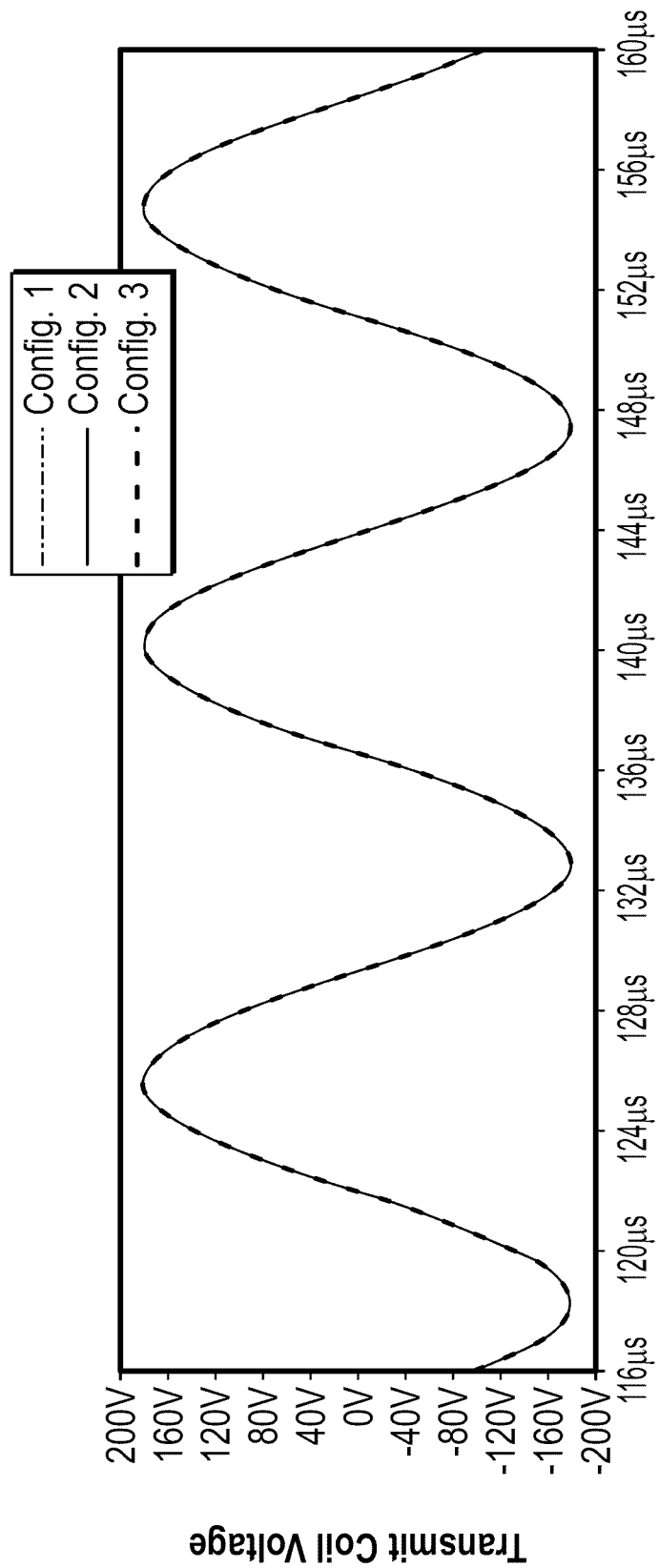
FIG. 11C is a plot showing voltage across a wireless power transmit coil based on various loading conditions presented to a wireless power transmitter according to some embodiments.

FIG. 11C is a plot showing voltage across a wireless power transmit coil based on various loading conditions presented to a wireless power transmitter according to some embodiments. As shown in FIG. 11C, in each of the first, second, and third configurations, the voltage across a wireless power transmit coil 914 corresponds to a sinusoidal wave having a peak magnitude of approximately 190V. Therefore, as shown, the voltage across the wireless power transmit coil 914 is substantially maintained. As discussed above, the measurement of the voltage may be maintained an input of the transmit coil relative to ground, or may be maintained across the resonant circuit including the transmit coil 914 and one or more capacitive components.

The system described above may be used to achieve the following potential advantages: a fast transient response of a wireless power transmitter, predictable system behavior, less complex interoperability criteria, and reduced design verification testing requirements. For example, according to some embodiments, a wireless power transfer system may respond to step changes in loading conditions in as little as about 50 us. Further, wireless power transmitter behavior may be dependent on fewer parameters and variables. Determination of wireless power receivers interoperability requirements may be less complex and can be more precisely defined, thereby maintaining efficiency and performance of the wireless power transfer system. Further, the magnitude of the magnetic field may be maintained at a substantially consistent level regardless of the presence and configuration of other devices. Therefore, a design verification procedure for a wireless power receiver may be less complex. Furthermore, the wireless power transmitter may behave substantially the same regardless of a change in loading conditions. As a result, a design verification procedure for a wireless power transmitter may also be less complex.

Figure 12:
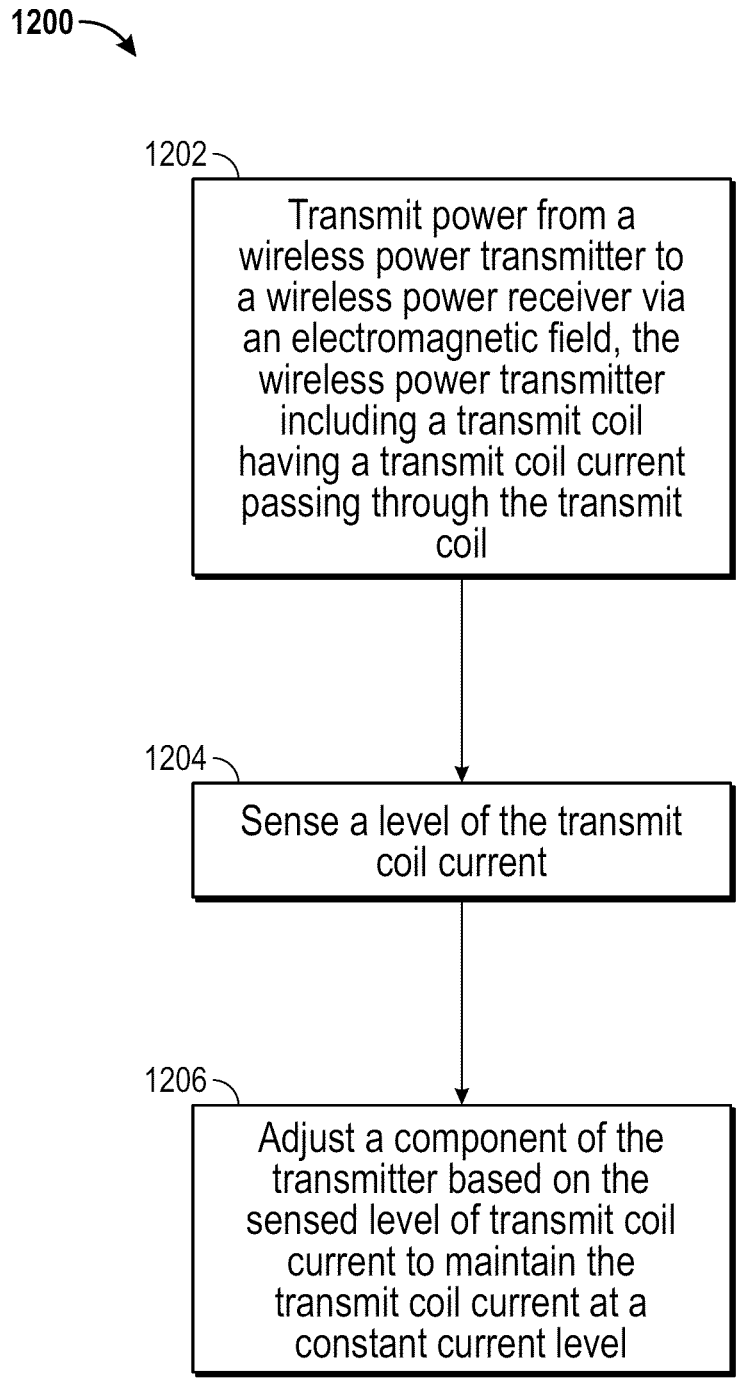
FIG. 12 is a flowchart of an example method for transferring power via a wireless filed according to some embodiments.

FIG. 12 is a flowchart of an example method for transferring power via a wireless filed according to some embodiments. As shown in FIG. 12, method 1200 includes transmitting power from a wireless power transmitter to a wireless power receiver via an electromagnetic field as illustrated in block 1202. The wireless power transmitter includes a wireless power transmit coil having a transmit coil current passing through the transmit coil. The method also includes sensing a level of the transmit coil current at block 1204. At block 1206, the method includes adjusting a component of the transmitter based on the sensed level of transmit coil current to maintain the transmit coil current at a constant level.

Figure 13:
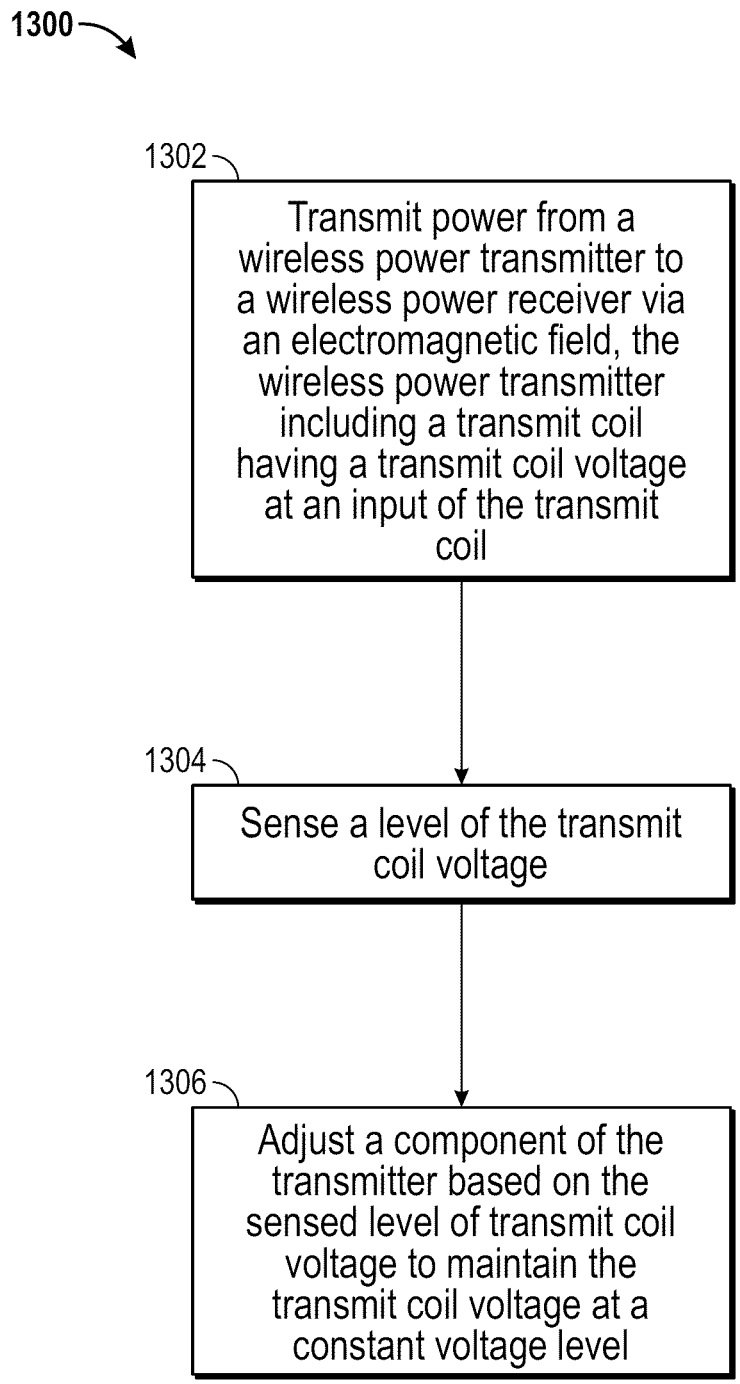
FIG. 13 is a flowchart of another example method for transferring power via a wireless filed according to some embodiments.

FIG. 13 is a flowchart of another example method for transferring power via a wireless filed according to some embodiments. As shown in FIG. 13, method 1300 includes transmitting power from a wireless power transmitter to wireless power receiver the electromagnetic field as illustrated by block 1302. The method also includes sensing a level of the transmit coil voltage at an input of the wireless power transmit coil as shown in block 1304. At block 1306, the method includes adjusting component of the transmitter based on the sensed level of transmit coil voltage to maintain the transmit coil voltage at a constant voltage level.

Figure 14:
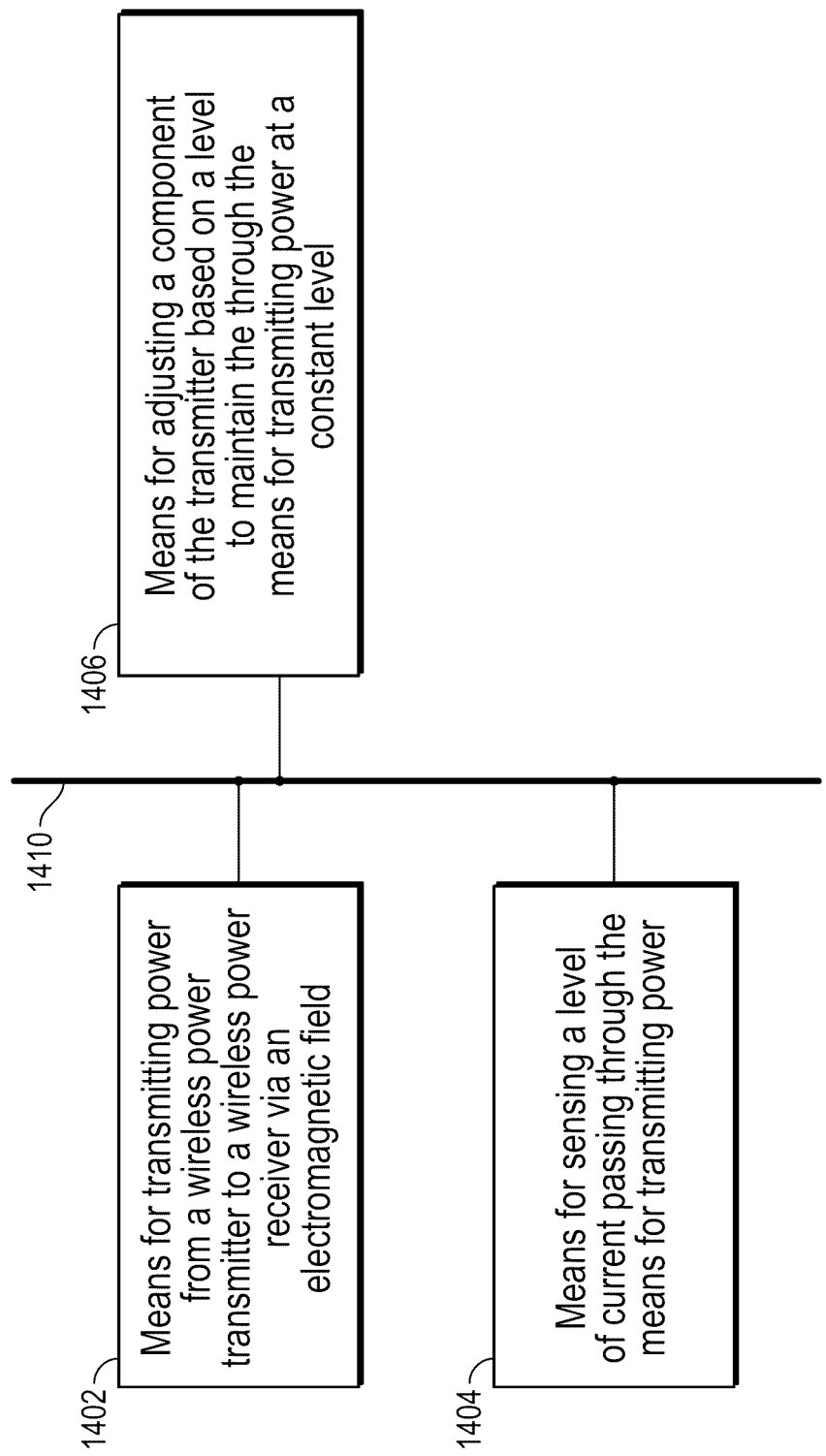
FIG. 14 is a functional block diagram of an example apparatus for transferring power via a wireless field according to some embodiments.

FIG. 14 is a functional block diagram of an example apparatus for transferring power via a wireless field according to some embodiments. As illustrated in FIG. 14, the apparatus includes a means for transmitting power from a wireless power transmitter to a wireless power receiver the electromagnetic field as shown in block 1402. The means for transmitting power 1402 may correspond to a wireless power transmit coil 914 as discussed above with reference to FIG. 9. The apparatus also includes a means for sensing the level of current passing through the means for transmitting power as shown in block 1404. For example, the means for sensing a current 1404 may correspond to a current sensor 960 as described above with reference to FIG. 9. Further, the apparatus includes a means for adjusting a component of the transmitter based on the sensed level to maintain the current through the means for transmitting power to constant level. The means for adjusting the component 1406 may correspond to a controller 915 as discussed above with reference to FIG. 9. Each of the components of the apparatus in FIG. 14 may be configured to communicate through a communication bus 1410.

Figure 15:
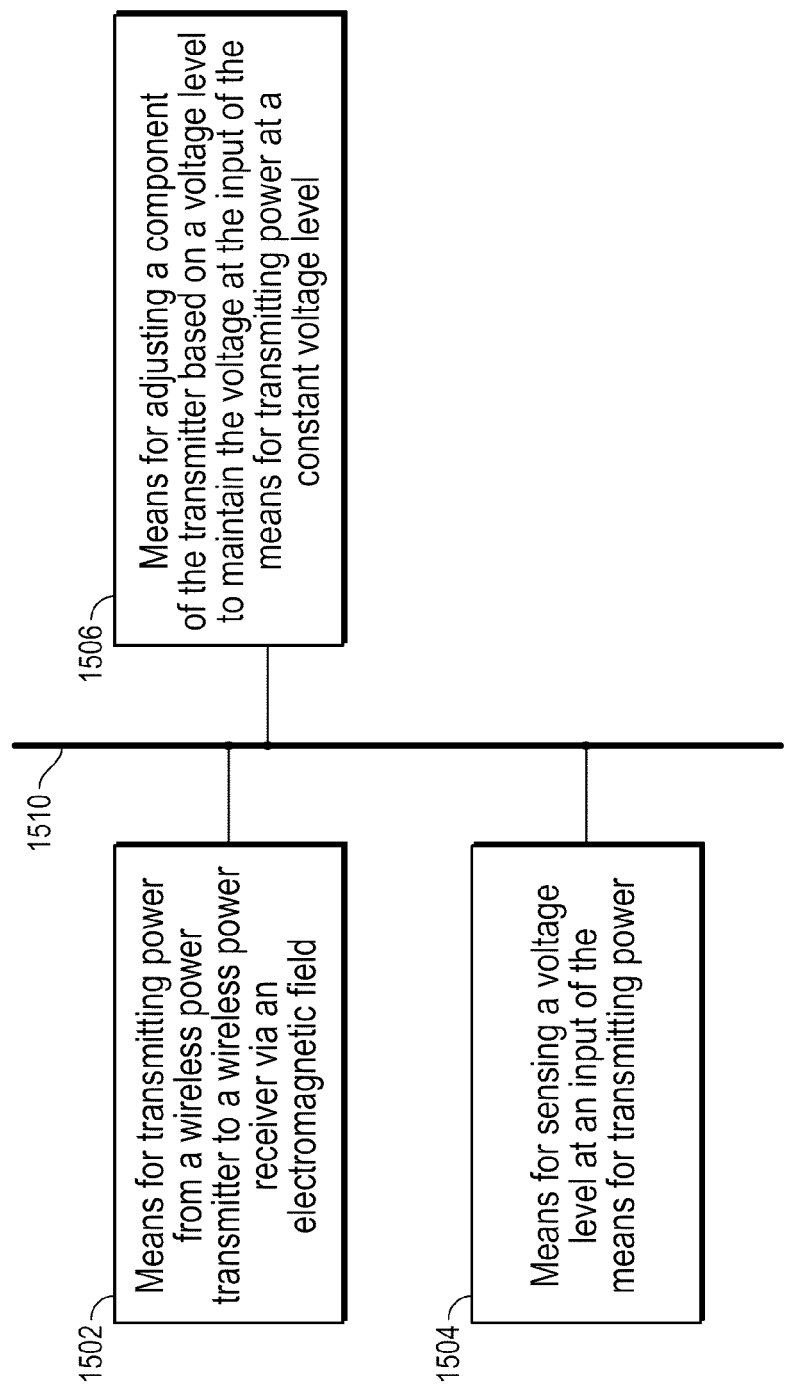
FIG. 15 is a functional block diagram of a another example of an apparatus for transferring power via a wireless field according to some embodiments.

FIG. 15 is a functional block diagram of an example apparatus for transferring power via a wireless field according to some embodiments. As illustrated in FIG. 15, the apparatus includes a means for transmitting power from a wireless power transmitter to a wireless power receiver the electromagnetic field as shown in block 1502. The means for transmitting power 1502 may correspond to a resonant circuit including a wireless power transmit coil 914 as discussed above with reference to FIG. 9. The apparatus also includes a means for sensing a voltage level at the input of the means for transmitting power as shown in block 1504. For example, the means for sensing a voltage level 1504 may correspond to a voltage sensor 950 as described above with reference to FIG. 9. Further, the apparatus includes a means for adjusting component of the transmitter based on the sensed voltage level to maintain the voltage at the input of the means for transmitting power to constant voltage level. The means for adjusting the component 1506 may correspond to a controller 915 as discussed above with reference to FIG. 9. Each of the components of the apparatus in FIG. 15 may be configured to communicate through a communication bus 1510.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality may be implemented in varying ways for each particular application, but such implementation decisions should not be interpreted as causing a departure from the scope of the embodiments of the invention.

The various illustrative blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art. A storage medium is coupled to the processor such that the processor can read information from, and write information to, the storage medium. In the alternative, the storage medium may be integral to the processor. Disk and disc, as used herein, includes compact disc (CD), laser disc, optical disc, digital versatile disc (DVD), floppy disk and blu ray disc where disks usually reproduce data magnetically, while discs reproduce data optically with lasers. Combinations of the above should also be included within the scope of computer readable media. The processor and the storage medium may reside in an ASIC. The ASIC may reside in a user terminal. In the alternative, the processor and the storage medium may reside as discrete components in a user terminal.

For purposes of summarizing the disclosure, certain aspects, advantages and novel features of the inventions have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

Various modifications of the above described embodiments will be readily apparent, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A wireless power transmitter comprising:
a wireless power transmit circuit configured to transmit power to a wireless power receiver via a magnetic field, the wireless power transmit circuit having a transmit circuit voltage at an input of the wireless power transmit circuit;
a sensor configured to sense a level of the transmit circuit voltage and generate a sensing signal; and
a controller configured to receive a receiver feedback signal from the wireless power receiver and further configured to adjust an electrical characteristic of the wireless power transmit circuit based on the sensing signal and based at least in part on the receiver feedback signal to maintain the transmit circuit voltage at a substantially constant voltage level.

2. The wireless power transmitter of claim 1, further comprising a driver configured to generate a driving signal, wherein the wireless power transmit circuit is configured to receive the driving signal and generate the magnetic field based on the driving signal.

3. The wireless power transmitter of claim 2, wherein the controller is configured to adjust a voltage level of the driving signal.

4. The wireless power transmitter of claim 2, wherein the driver is configured to receive a drive voltage and generate the driving signal based on the received drive voltage, and wherein the controller is configured to adjust a voltage level of the drive voltage.

5. The wireless power transmitter of claim 4, wherein the controller is configured to decrease the voltage level of the drive voltage when the sensing signal indicates that the transmit circuit voltage is greater than a threshold value.

6. The wireless power transmitter of claim 4, wherein the controller is configured to increase the voltage level of the drive voltage when the sensing signal indicates that the transmit circuit voltage is less than a threshold value.

7. The wireless power transmitter of claim 2, wherein the controller is configured to adjust a frequency of the driving signal.

8. The wireless power transmitter of claim 2, wherein the controller is configured to increase a voltage level of the driving signal when the sensing signal indicates that the transmit circuit voltage is less than a threshold value.

9. The wireless power transmitter of claim 2, wherein the controller is configured to decrease a voltage level of the driving signal when the sensing signal indicates that the transmit circuit voltage is greater than a threshold value.

10. The wireless power transmitter of claim 1, further comprising a coil impedance adjustment circuit, and wherein the controller is configured to adjust an impedance of the coil impedance adjustment circuit to maintain the transmit circuit voltage at the substantially constant voltage level.

11. The wireless power transmitter of claim 1, wherein the controller is configured to perform a first adjustment based at least in part on the receiver feedback signal and to perform a second adjustment based at least in part on the sensing signal.

12. A method for transferring power via a wireless field comprising:
    transmitting power from a wireless power transmitter to a wireless power receiver via a magnetic field, the wireless power transmitter including a wireless power transmit circuit having a transmit circuit voltage at an input of the transmit circuit;
    receiving a receiver feedback signal from the wireless power receiver;
    sensing a level of the wireless power transmit circuit voltage; and
    adjusting an electrical characteristic of the wireless power transmit circuit based on the sensed level of transmit circuit voltage and based at least in part on the receiver feedback signal to maintain the transmit circuit voltage at a substantially constant voltage level.

13. The method of claim 12, further comprising generating a driving signal, wherein the wireless power transmit circuit is configured to receive the driving signal and generate the magnetic field based on the driving signal.

14. The method of claim 13, wherein adjusting the electrical characteristic comprises adjusting a voltage level of the driving signal.

15. The method of claim 13, wherein adjusting the electrical characteristic comprises adjusting a frequency of the driving signal.

16. The method of claim 13, wherein adjusting the electrical characteristic comprises increasing a voltage level of the driving signal when the sensing signal indicates that the voltage through the wireless power transmit circuit is less than a threshold value.

17. The method of claim 13, wherein adjusting the electrical characteristic comprises decreasing a voltage level of the driving signal when the sensing signal indicates that the voltage through the wireless power transmit circuit is greater than a threshold value.

18. The method of claim 12, wherein the driving signal is generated based on a drive voltage, and wherein adjusting the electrical characteristic comprises adjusting a voltage level of the drive voltage.

19. The method of claim 18, wherein adjusting the electrical characteristic comprises increasing the voltage level of the drive voltage when the sensing signal indicates that the voltage through the wireless power transmit circuit is less than a threshold value.

20. The method of claim 18, wherein adjusting the electrical characteristic comprises decreasing the voltage level of the drive voltage when the sensing signal indicates that the voltage through the wireless power transmit circuit is greater than a threshold value.

21. The method of claim 12, wherein adjusting the electrical characteristic comprises adjusting an impedance of the wireless power transmit circuit to maintain the transmit circuit voltage at the substantially constant voltage level.

22. The method of claim 12, further comprising:
    performing a first adjustment based at least in part on the receiver feedback signal; and
    performing a second adjustment based at least in part on the sensing signal.

23. An apparatus for transferring power via a wireless field comprising:
    means for transmitting power from a wireless power transmitter to a wireless power receiver via a magnetic field;
    means for receiving a receiver feedback signal from the wireless power receiver;
    means for sensing a voltage level at an input of the means for transmitting power; and
    means for adjusting an electrical characteristic of the transmitter based on the sensed voltage level and based at least in part on the receiver feedback signal to maintain the voltage at the input of the means for transmitting power at a substantially constant voltage level.

24. The apparatus of claim 23, wherein the means for transmitting power comprises a transmit circuit current, the means for sensing a voltage level comprises a voltage sensor, and the means for adjusting the electrical characteristic of the transmitter comprises a controller.

* * * * *